US007442242B2

(12) United States Patent
Wu et al.

(10) Patent No.: US 7,442,242 B2
(45) Date of Patent: *Oct. 28, 2008

(54) PHASE CHANGE INKS CONTAINING SPECIFIC COLORANTS

(75) Inventors: Bo Wu, Wilsonville, OR (US); Trevor J. Snyder, Newberg, OR (US); Jeffrey H. Banning, Hillsboro, OR (US); Jule W. Thomas, Jr., West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 382 days.

This patent is subject to a terminal disclaimer.

(21) Appl. No.: 11/290,258

(22) Filed: Nov. 30, 2005

(65) Prior Publication Data

US 2007/0120915 A1 May 31, 2007

(51) Int. Cl.
*C09D 11/02* (2006.01)
(52) U.S. Cl. .................... 106/31.29; 106/31.61
(58) Field of Classification Search ............. 106/31.29
See application file for complete search history.

(56) References Cited

U.S. PATENT DOCUMENTS

| | | | |
|---|---|---|---|
| 3,653,932 A | 4/1972 | Berry et al. | |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,372,852 A | 12/1994 | Titterington et al. | |
| 5,496,879 A | 3/1996 | Griebel et al. | |
| 5,621,022 A | 4/1997 | Jaeger et al. | |

(Continued)

FOREIGN PATENT DOCUMENTS

| | | |
|---|---|---|
| EP | 0 206 286 B1 | 5/1990 |
| EP | 0 187 352 B1 | 6/1991 |
| EP | 0519138 A2 | 12/1992 |
| WO | WO 94/04619 | 3/1994 |

OTHER PUBLICATIONS

Copending U.S. Appl. No. 11/197,600, filed Aug. 4, 2005, entitled "Processes for Preparing Phase Change Inks", with the named inventors Frank P. Lee, Raymond W. Wong, and Sheau Van Kao.
Copending U.S. Appl. No. 11/126,745, filed May 11, 2005, entitled "Method of Purification of Polyalkylene Materials," by San-Ming Yang et al.

(Continued)

*Primary Examiner*—J. A. Lorengo
*Assistant Examiner*—Veronica Faison-Gee
(74) *Attorney, Agent, or Firm*—Judith L. Byorick

(57) ABSTRACT

Disclosed is a phase change ink composition comprising (a) a phase change ink carrier comprising (1) an amide; and (2) a polyethylene wax having an average peak molecular weight of from about 350 to about 730 and a polydispersity of from about 1.0001 to about 1.5; and (b) a colorant compound of the formula

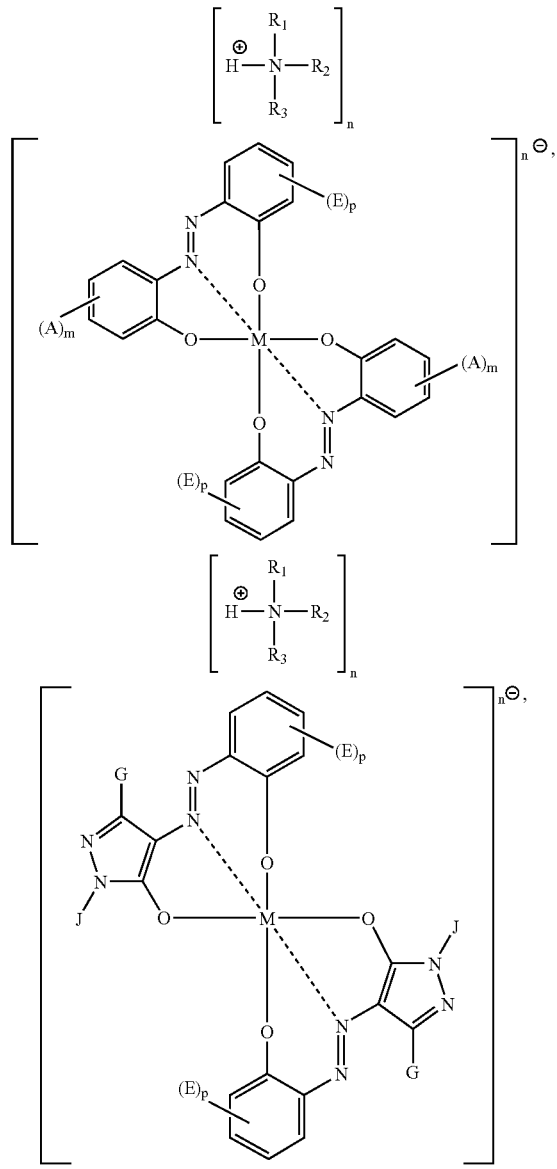

or mixtures thereof, wherein $R_1$, $R_2$, $R_3$, M, A, E, G, J, m, n, and p are as defined herein.

103 Claims, 1 Drawing Sheet

U.S. PATENT DOCUMENTS

| | | | |
|---|---|---|---|
| 6,001,904 | A | 12/1999 | Matzinger et al. |
| 6,147,140 | A | 11/2000 | Jaeger et al. |
| 6,860,930 | B2 | 3/2005 | Wu et al. |
| 2005/0130054 | A1 | 6/2005 | Yuan et al. |

OTHER PUBLICATIONS

Copending U.S. Appl. No. 11/290,221, filed Nov. 30, 2005, entitled "Phase Change Inks," by Bo Wu et al.

Copending U.S. Appl. No. 11/291,055, filed Nov. 30, 2005, entitled "Phase Change Inks," by Bo Wu et al.

Copending U.S. Appl. No. 11/290,263, filed Nov. 30, 2005, entitled "Phase Change Inks," by Bo Wu et al.

Copending U.S. Appl. No. 11/291,056, filed Nov. 30, 2005, entitled "Colorant Compounds," by Jeffery H. Banning et al.

Copending U.S. Appl. No. 11/291,057, filed Nov. 30, 2005, entitled "Phase Change Inks," by Jeffery H. Banning et al.

Copending U.S. Appl. No. 11/290,265, filed Nov. 30, 2005, entitled "Phase Change Inks," by Trevor J. Snyder et al.

Copending U.S. Appl. No. 11/290,222, filed Nov. 30, 2005, entitled "Phase Change Inks Containing Fischer-Tropsch Waxes," by Bo Wu et al.

English abstract for German Patent Publication DE 4205636AL.

English abstract for German Patent Publication DE 4205713AL.

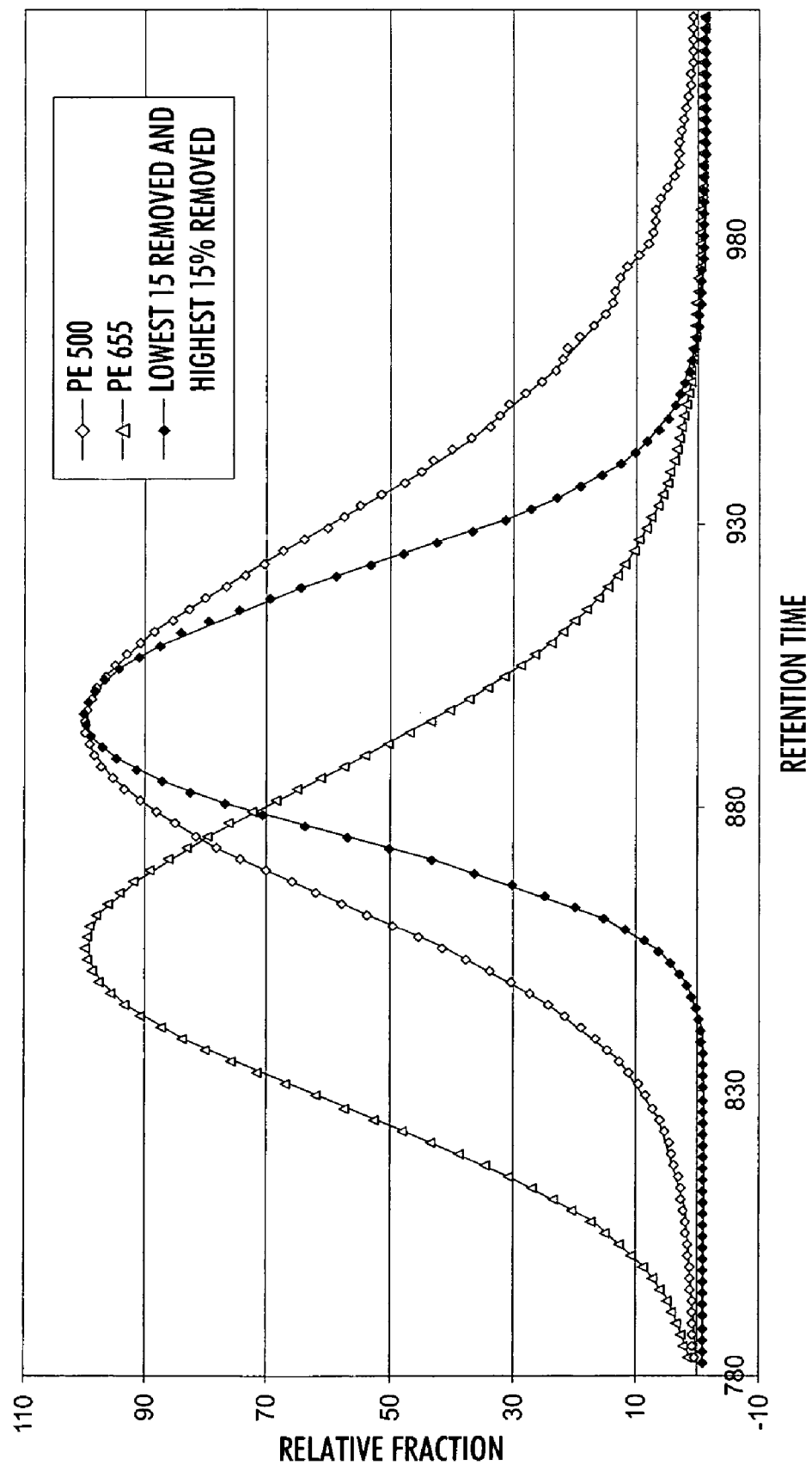

PHASE CHANGE INKS CONTAINING SPECIFIC COLORANTS

CROSS-REFERENCE TO RELATED APPLICATIONS

Copending Application U.S. Ser. No. 11/126,745, filed May 11, 2005, entitled "Method of Purification of Polyalkylene Materials," with the named inventors San-Ming Yang, Thomas E. Enright, Val Magdalinis, Ahmed Alzamly, Man C. Tam, Carol A. Jennings, Peter M. Kazmaier, and Marko D. Saban, the disclosure of which is totally incorporated herein by reference, discloses a method of purifying polyalkylene. Also included are microencapsulated Gyricon beads, phase change ink, and toners comprising the purified polyalkylene.

Copending Application U.S. Ser. No. 11/290,221, filed concurrently herewith, entitled "Phase Change Inks," with the named inventors Bo Wu, Stephan V. Drappel, Trevor J. Snyder, Donald R. Titterington, Jule W. Thomas, Jr., C. Geoffrey Allen, Harold R. Frame, and Wolfgang G. Wedler, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end; (2) melting the ink; and (3) causing droplets of the melted ink to be ejected in an imagewise pattern onto a substrate.

Copending Application U.S. Ser. No. 11/291,055, filed concurrently herewith, entitled "Phase Change Inks," with the named inventors Bo Wu, Trevor J. Snyder, Stephan V. Drappel, Jule W. Thomas, Jr., Donald R. Titterington, and C. Geoffrey Allen, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0; (2) melting the ink; and (3) causing droplets of the melted ink to be ejected in an imagewise pattern onto a substrate.

Copending Application U.S. Ser. No. 11/290,263, filed concurrently herewith, entitled "Phase Change Inks," with the named inventors Bo Wu, Trevor J. Snyder, Jule W. Thomas, Jr., and Patricia Ann Wang, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500; (2) melting the ink; and (3) causing droplets of the melted ink to be ejected in an imagewise pattern onto a substrate.

Copending Application U.S. Ser. No. 11/290,056, filed concurrently herewith, entitled "Colorant Compounds," with the named inventors Jeffery H. Banning, Bo Wu, and C. Wayne Jaeger, the disclosure of which is totally incorporated herein by reference, discloses colorant compounds of the formulae

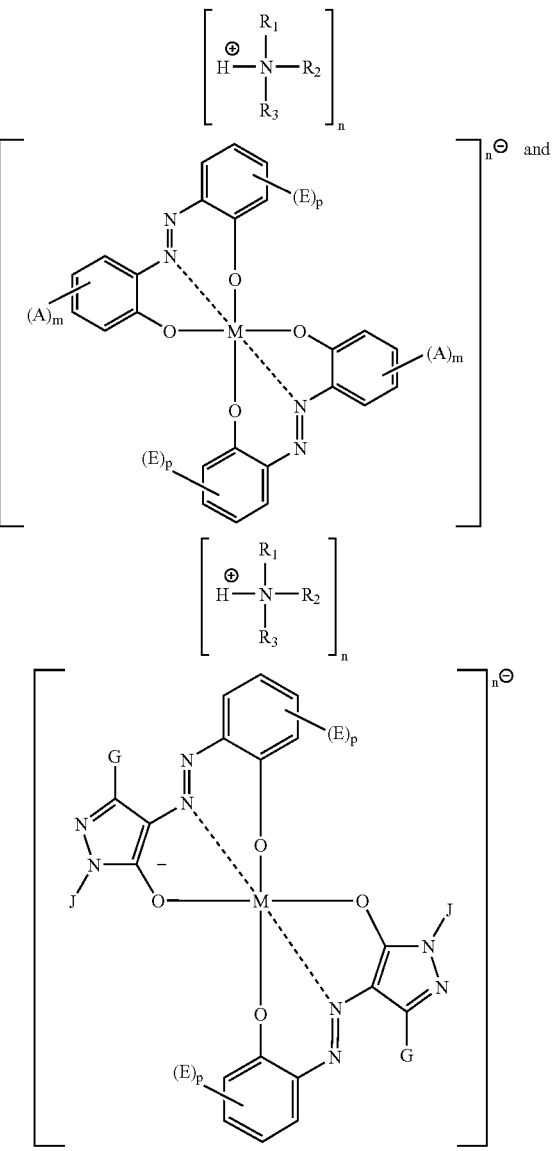

wherein $R_1$, $R_2$, $R_3$, M, A, E, G, J, m, n, and p are as defined therein.

Copending Application U.S. Ser. No. 11/291,057, filed concurrently herewith, entitled "Phase Change Inks," with the named inventors Jeffery H. Banning, Bo Wu, and C. Wayne Jaeger, the disclosure of which is totally incorporated herein by reference, discloses a phase change ink composition comprising a phase change ink carrier and a colorant compound of the formula

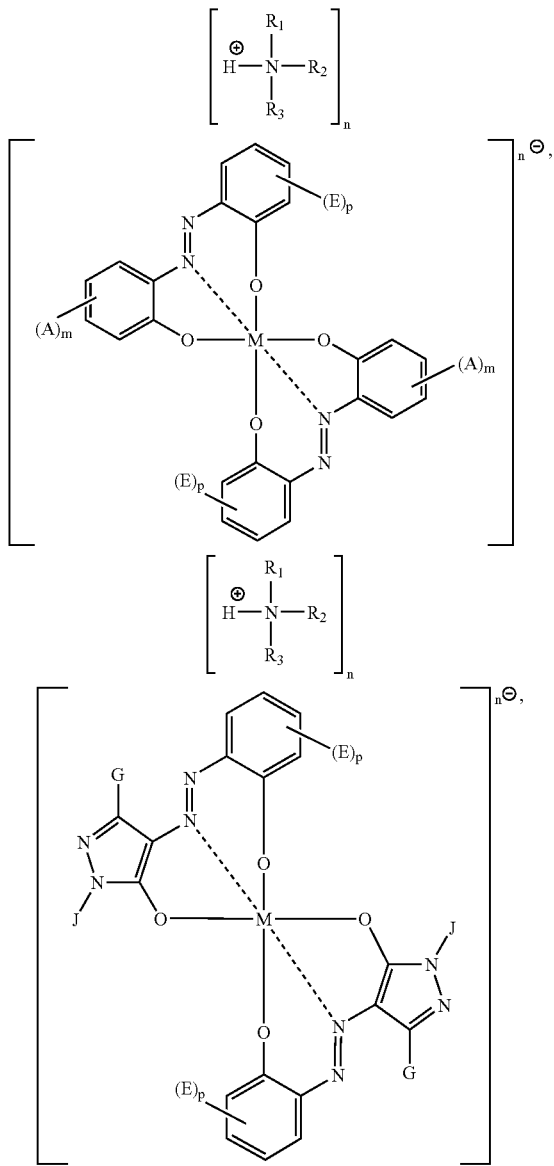

or mixtures thereof, wherein $R_1$, $R_2$, $R_3$, M, A, E, G, J, m, n, and p are as defined therein.

Copending Application U.S. Ser. No. 11/209,265, filed concurrently herewith, entitled "Phase Change Inks," with the named inventors Trevor J. Snyder, Bo Wu, Patricia Ann Wang, Donald R. Titterington, Jule W. Thomas, Jr., Randall R. Bridgeman, and Mark H. Tennant, the disclosure of which is totally incorporated herein by reference, discloses a phase change ink composition comprising an ink carrier and a colorant, said ink being suitable for use in an indirect printing process wherein the ink is jetted from a printhead onto a heated intermediate transfer member and subsequently transferred from the intermediate transfer member to a final recording substrate, wherein: (a) the ink can be jetted from the printhead onto the intermediate transfer member when the ink is maintained at a temperature of about 125° C. or lower; (b) the ink can be jetted without purging from a printer maintained at a standby temperature of about 100° C. or lower; and (c) the ink has a cohesive failure temperature of at least about 54° C.

Copending Application U.S. Ser. No. 11/290,022, filed concurrently herewith, entitled "Phase Change Inks Containing Fischer-Tropsch Waxes," with the named inventors Bo Wu, Patricia Ann Wang, Trevor J. Snyder, and Jule W. Thomas, Jr., the disclosure of which is totally incorporated herein by reference, discloses a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3. Also disclosed is a process which comprises (1) incorporating into an ink jet printing apparatus a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3; (2) melting the ink; and (3) causing droplets of the melted ink to be ejected in an imagewise pattern onto a substrate.

BACKGROUND

Disclosed herein are phase change inks. More specifically, disclosed herein are phase change inks containing specific colorant compositions in specific vehicle formulations. One embodiment is directed to a phase change ink composition comprising (a) a phase change ink carrier comprising (1) an amide; and (2) a polyethylene wax having an average peak molecular weight of from about 350 to about 730 and a polydispersity of from about 1.0001 to about 1.5; and (b) a colorant compound of the formula

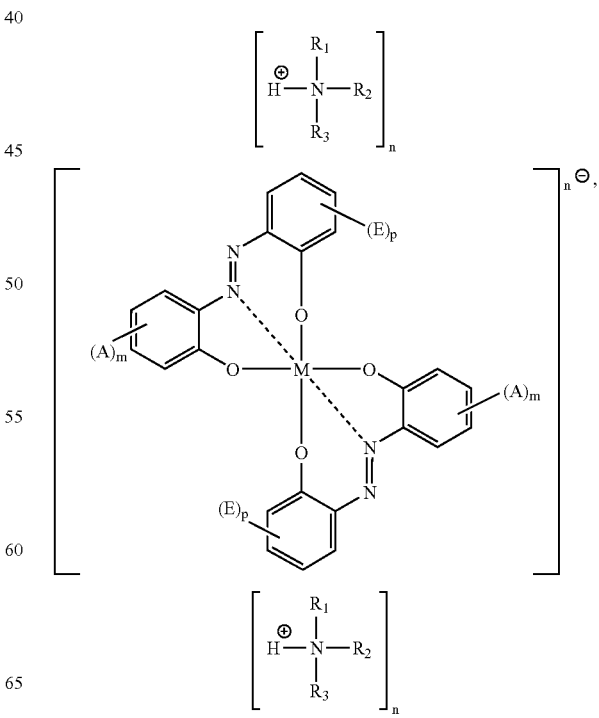

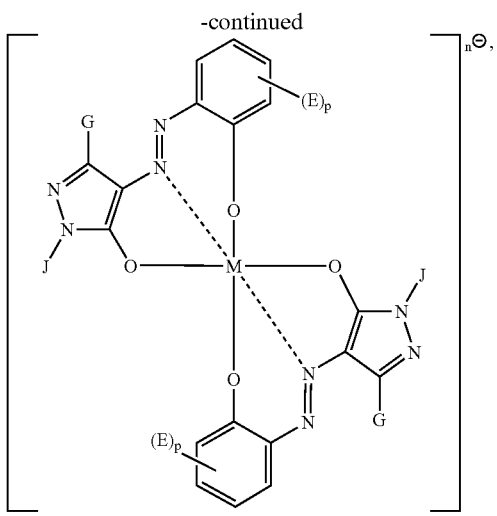

or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms (excluding atoms in any substituents) in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3. Another embodiment is directed to a process which comprises (1) incorporating into an ink jet printing apparatus the aforementioned phase change ink; (2) melting the ink; and (3) causing droplets of the melted ink to be ejected in an imagewise pattern onto a substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,147,140 (Jaeger et al.), the disclosure of which is totally incorporated herein by reference, discloses a phase change ink composition comprising a phase change ink carrier system in combination with a compatible colorant system, the colorant system comprising a combination of (1) a black colorant having an absorbance in the 475 nanometer region which is less than 80 percent of the absorbance at the 580 nanometer region and (2) a sufficient amount of at least one other colorant having an absorbance in the 475 nanometer region whereby the colorant has a ratio of absorbance in the 475 nanometer region to the 580 nanometer region from about 0.92:1.0 to about 1.01:1.0.

U.S. Pat. No. 6,860,930 (Wu et al.), the disclosure of which is totally incorporated herein by reference, discloses a phase change ink composition comprising (a) a colorant and (b) a carrier comprising a polyamide, wherein the polyamide component of the carrier contains at least about 10 percent by weight of a branched triamide.

U.S. Patent Publication 2005/0130054 (Yuan et al.), the disclosure of which is totally incorporated herein by reference, discloses wax based inks for phase change/hot melt inkjet printing or thermal transfer printing applications. Also disclosed are waxes useful for toners for use in electrostatographic printing applications. Both materials are prepared using a wax having a narrow melting range. The narrow melting range of the wax reduces energy requirements in printing applications. The use of the waxes also promotes release for high speed printing and especially promotes fast drying in wax based ink applications.

U.S. Pat. No. 6,001,904 (Matzinger et al.), the disclosure of which is totally incorporated herein by reference, discloses phase change (hot melt) ink compositions for use in a phase change (hot melt) ink jet recording device in which recording is conducted by thermally melting the ink at a temperature above ambient temperature (20° C.) to provide prints that possess high quality images, scratch resistance, abrasion resistance, low-temperature storage stability and flexibility, offset and pick resistance, adhesion, and other desired properties to comprise: (a) from about 0.1% to about 30% of one or more colorants; and (b) from about 0.1 to about 99.9% of one or more reversibly-crosslinked-polymers. Components other than those listed above may be included in the ink compositions to achieve specific printer, substrate, or end use requirements. Furthermore, the invention also includes methods for the preparation of reversibly-crosslinked-polymers and for their use in the above-described inks.

While known compositions and processes are suitable for their intended purposes, a need remains for improved colorant compounds. In addition, a need remains for colorant compounds particularly suitable for use in phase change inks. Further, a need remains for colorant compounds with a desirable degree of thermal stability. Additionally, a need remains for colorant compounds that exhibit a desirable degree of solubility in vehicles employed in phase change inks. There is also a need for colorant compounds that are compatible with phase change ink vehicles capable of operating with reduced energy requirements. In addition, there is a need for colorant compounds that exhibit desirably high chroma in phase change inks. Further, there is a need for colorant compounds that exhibit satisfactory hue in phase change inks. Additionally, there is a need for colorant compounds that exhibit a high degree of light fastness in phase change inks. A need also remains for colorant compounds that exhibit a relatively low degree of diffusion and bleeding into adjoining printed areas of different colors when incorporated into phase change inks and printed. In addition, a need remains for colorant compounds that are safe to handle. Further, a need remains for colorant compounds that enable generation of prints with reduced pile height. In addition, a need remains for phase change inks that can be jetted at temperatures below about 125° C. Further, a need remains for phase change inks that can be jetted with reduced energy requirements. Additionally, a need remains for phase change inks that can be jetted with less expensive printheads. There is also a need for phase change inks that enable improved thermal stability of the inks manifested as the color's stability over time when heated in printers. In addition, there is a need for phase change inks that enable improved printer reliability. Further, there is a need for phase change inks that enable quick recovery times from standby mode. Additionally, there is a need for phase change inks that enable printing with "instant-on" mode. A need also remains for phase change inks that exhibit desirable viscosity values at reduced printing temperatures. In addition, a need remains for phase change inks that enable the aforementioned advantages and also exhibit good printing characteristics, such as transfixing properties (including dither and solid fill dropout performance), acceptable missed jets, folding and creasing performance, gloss, color intensity, recovery after standby mode, and the like. Further, a need remains for phase change inks that generate images with improved hardness. Additionally, a need remains for phase change inks that generate images with improved gloss. There is also a need for phase change inks that exhibit reduced sweating; sweating is a problem wherein some ink ingredients migrate to the surface of solid ink sticks and aggregate at the ink stick surface inside the printer; the sticky "sweat" gradually drains down to the bottom and can cause the ink sticks to be difficult to slide in the ink load racks in the printers. In addition, there is a need for phase change inks that generate images with reduced show through when printed on paper substrates. Further, there is a need for phase change inks that exhibit reduced clogging of printheads while exhibiting all of the aforementioned advantages. Additionally, there is a need for phase change inks that enable reduced standby temperatures of phase change ink jet printheads without leading to clogging of the printhead. A need also remains for phase change inks with desirably low freezing points. In addition, a need remains for phase change inks that transfer efficiently from an intermediate transfer member to a final recording substrate with reduced pixels left on the intermediate transfer member when the intermediate transfer member is at a desirably high temperature to enable efficient transfer member cooling and avoid automatic printer shutoff from heating of the intermediate transfer member by the ink, while also enabling jetting of the ink at a desirably low temperature. Further, a need remains for phase change inks that exhibit desirably high smudge temperatures when still-hot prints pass along guidance tracks in the printer, thereby reducing accumulation of ink along these guidance tracks that could later be transferred to blank paper. Additionally, a need remains for phase change inks with the above advantages that contain desirably high concentrations of a black colorant.

SUMMARY

Disclosed herein is a phase change ink composition comprising (a) a phase change ink carrier comprising (1) an amide; and (2) a polyethylene wax having an average peak molecular weight of from about 350 to about 730 and a polydispersity of from about 1.0001 to about 1.5; and (b) a colorant compound of the formula

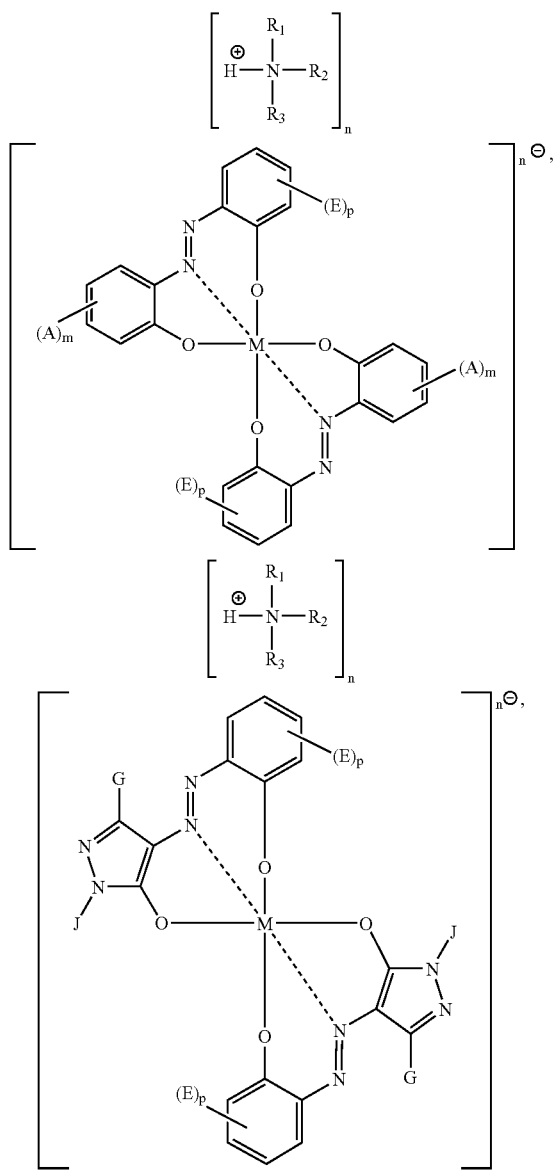

or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms (excluding atoms in any substituents) in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3. Another embodiment is directed to a process which comprises (1) incorporating into an ink jet printing apparatus the aforementioned phase change ink; (2) melting the ink; and (3) causing droplets of the melted ink to be ejected in an imagewise pattern onto a substrate.

BRIEF DESCRIPTION OF THE DRAWING

The FIGURE is a reproduction of high temperature gel permeation chromatography (also called size exclusion chromatography (SEC)) curves obtained for polyethylene waxes of different average peak molecular weight values, showing the relative amounts of molecules with different molecular weights present in the sample on the "y" axis and the retention time on the "x" axis.

DETAILED DESCRIPTION

Disclosed herein are colorant compounds of the formulae

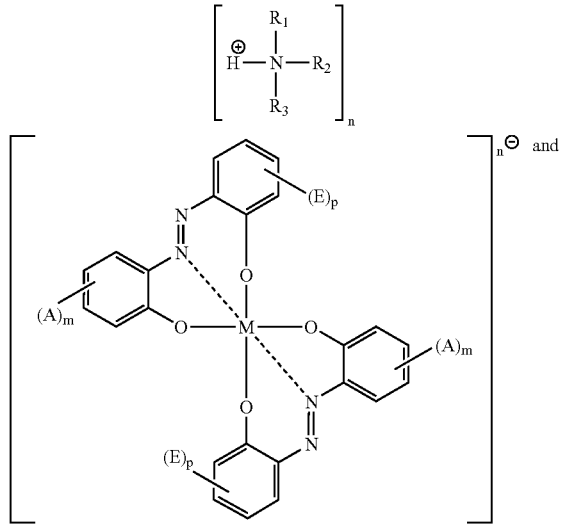

-continued

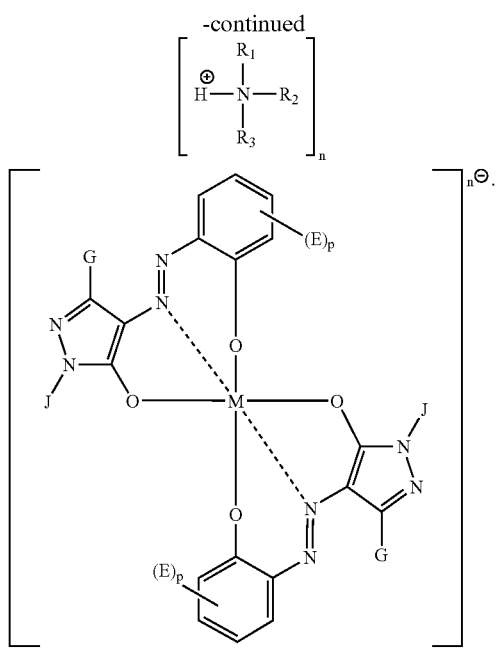

wherein each A, each E, and each G, independently of the other, represents a substituent on a phenyl or pyrazolone ring, such as (but not limited to) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 50 carbon atoms, in another embodiment with no more than about 18 carbon atoms, and in yet another embodiment with no more than about 2 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 14 carbon atoms, and in yet another embodiment with no more than about 10 carbon atoms, although the number of carbon atoms can be outside of these ranges, such as phenyl, naphthyl, anthryl, or the like, an arylalkyl group (including substituted and unsubstituted arylalkyl groups, wherein the alkyl portion of the arylalkyl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as benzyl or the like, an alkylaryl group (including substituted and unsubstituted alkylaryl groups, wherein the alkyl portion of the alkylaryl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as tolyl or the like, a hydroxy group, a halogen atom, an amine group (including primary, secondary, and tertiary amine groups), an imine group, an ammonium group, a cyano group, a pyridine group, a pyridinium group, an ether group, an aldehyde group, a ketone group, an ester group, an amide group, a carbonyl group, a thiocarbonyl group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azo group, a cyanato group, a carboxylate group, a carboxylic acid group, a urethane group, a urea group, and the like, wherein G can also be a hydrogen atom, m is an integer of 0, 1, or 2, p is an integer of 0, 1, 2, 3, or 4, and J represents (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 50 carbon atoms, in another embodiment with no more than about 18 carbon atoms, and in yet another embodiment with no more than about 2 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 14 carbon atoms, and in yet another embodiment with no more than about 10 carbon atoms, although the number of carbon atoms can be outside of these ranges, such as phenyl, naphthyl, anthryl, or the like, (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups (including primary, secondary, and tertiary amine groups), imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azo groups, cyanato groups, carboxylate groups, carboxylic acid groups, urethane groups, urea groups, and the like, wherein two or more substituents on the phenyl or pyrazolone rings can be joined together to form a ring. These colorants include chromogenic compounds derived from compounds of the formulae

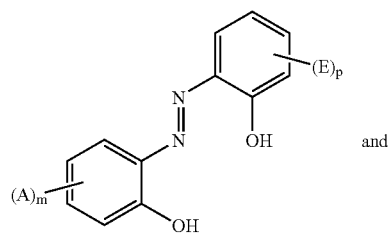

and

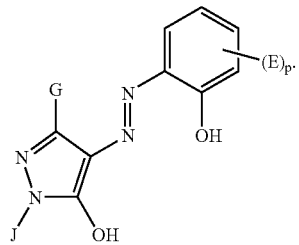

The integer "n" represents both the charge on the chromogen compound complex and the number of countercations present. This integer is at least 1, and can also be 2 or 3.

These compounds form complexes with metal compounds to form chromogenic compounds. Suitable metals M include any metals that form complexes with the above-indicated compounds wherein the complex will have a negative charge of at least −1. Examples of suitable metals include (but are not limited to) chromium, iron, cobalt, molybdenum, tungsten, ruthenium, osmium, rhodium, iridium, manganese, rhenium, vanadium, niobium, tantalum, titanium, zirconium, hafnium, scandium, yttrium, lanthanum, zinc, aluminum, metals in the Lanthanide Series, and the like, as well as mixtures thereof.

While not being limited to any particular theory, it is believed that the complexes formed are as follows:

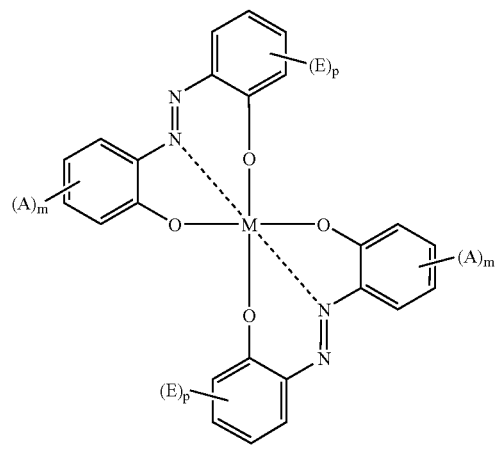

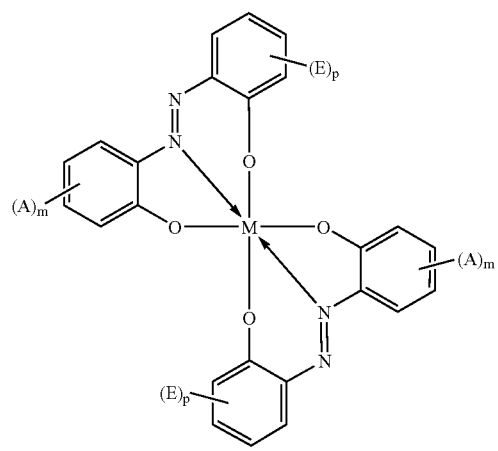

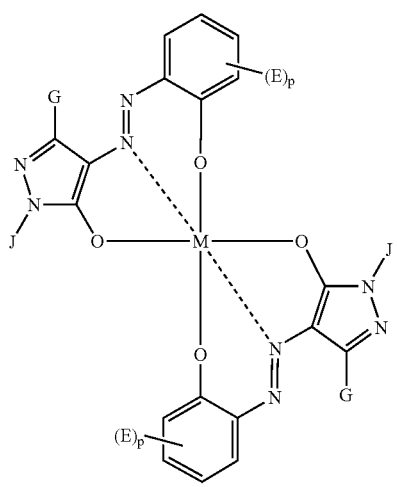

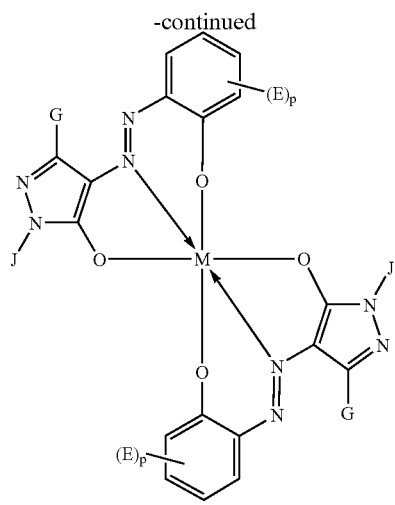

wherein the dotted lines and arrows represent coordination bonds between the lone pair electrons on the nitrogen atoms and the metal atom. Since the oxygen atoms each impart a negative charge to the resulting complex, the resulting charge of the compound depends upon the valence state of the metal.

Some specific examples of suitable chromogenic compound complexes for the compounds disclosed herein include (but are not limited to) the following:

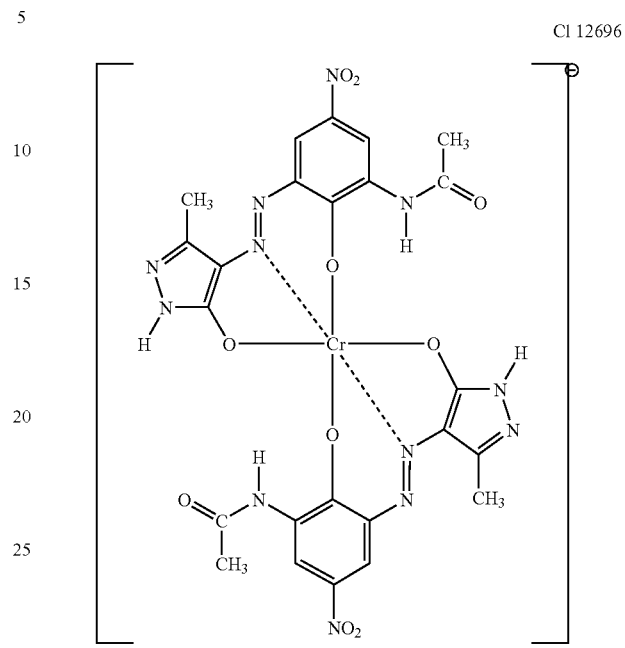
Cl 12696

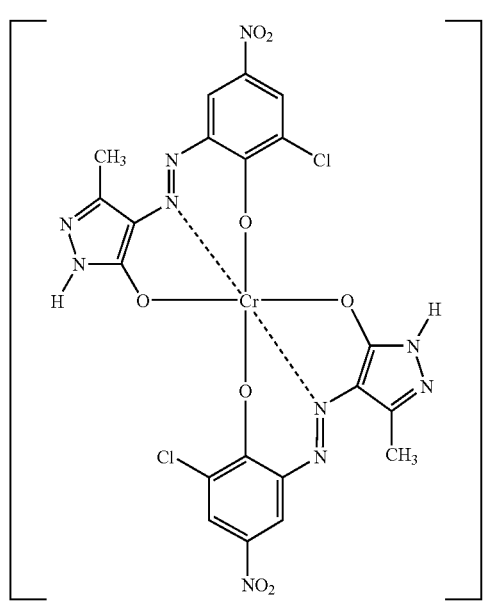
Cl 12695

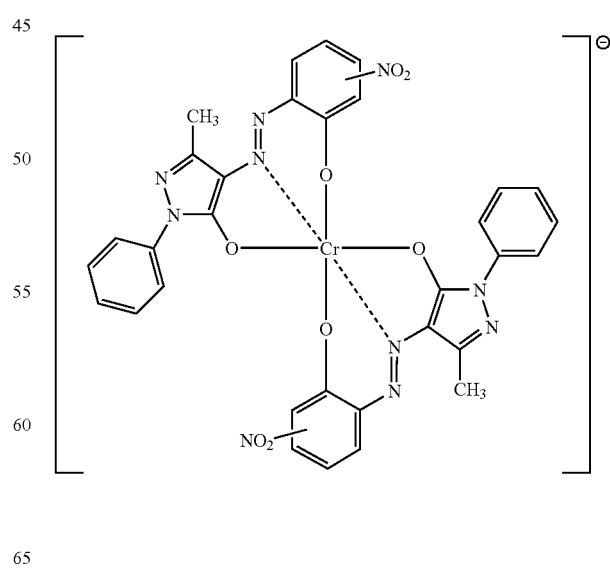
Cl 12716

CI 11836

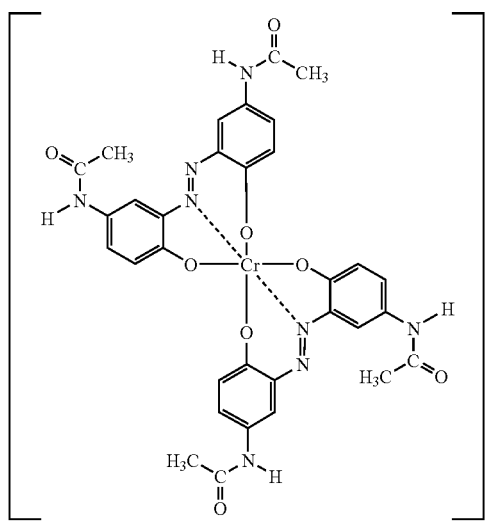

CI 12205

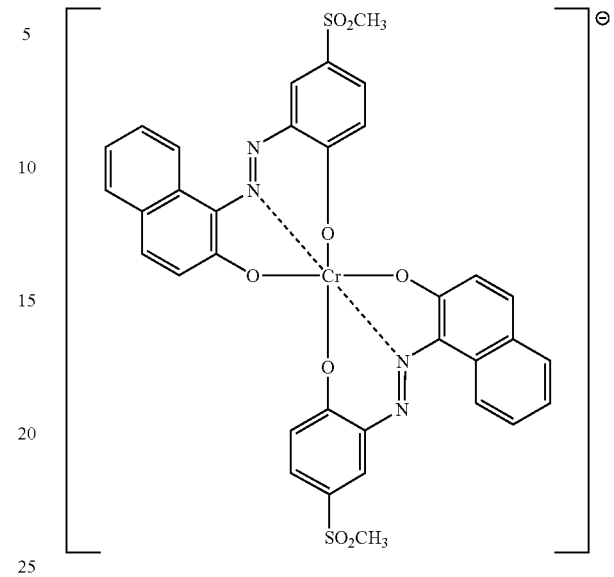

CI 12195

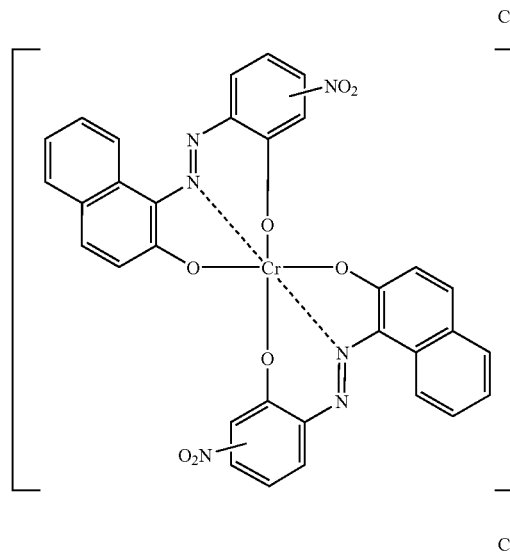

CI 12695

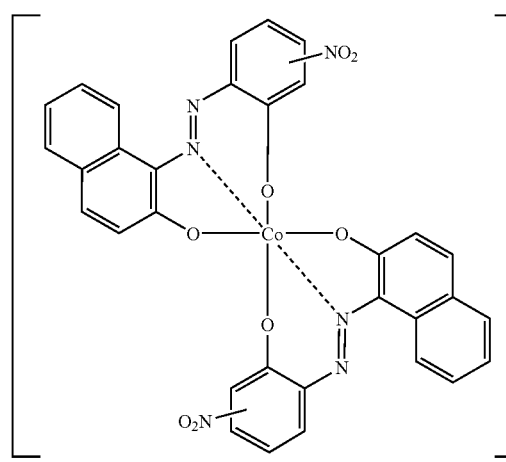

CI 12196 and the like, as well as mixtures thereof.

The chromogenic compound complexes have a negative charge of at least −1, and accordingly are associated with a counterion. The counterion is of the formula

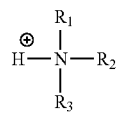

wherein $R_1$, $R_2$, and $R_3$ each, independently of the others, can be (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 150 carbon atoms, in another embodiment with no more than about 54 carbon atoms, and in yet another embodiment with no more than about 48 carbon atoms, although the number of carbon atoms can be outside of these ranges, (iii) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 56 carbon atoms, in another embodiment with no more than about 24 carbon atoms, and in yet another embodiment with no more than about 18 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 56 carbon atoms, in another embodiment with no more than about 24 carbon atoms, and in yet another embodiment with no more than about 18 carbon atoms, although the number of carbon atoms can be outside of these ranges, such as tolyl or the like, provided that the total number of carbon atoms and hetero atoms (excluding atoms in any substituents) in $R_1+R_2+R_3$ is in one embodiment at least about 18, in another embodiment at least about 19, in yet another embodiment at least about 20, in another embodiment at least about 21, in yet another embodiment at least about 22, in still another embodiment at least about 23, and in another embodiment at least about 24, wherein the total number of carbon atoms and hetero atoms (excluding atoms in any substituents other than alkyl, aryl, arylalkyl, or alkylaryl substituents) in $R_1+R_2+R_3$ is one embodiment no more than about 150, in another embodiment no more than about 54, and in another embodiment no more than about 48, although the total number of carbon atoms can be outside of this range, wherein the substituents on the substituted alkyl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azo groups, cyanato groups, carboxylate groups, carboxylic acid groups, urethane groups, urea groups, mixtures thereof, and the like, wherein two or more substituents can be joined together to form a ring.

The colorant compounds disclosed herein can be prepared by any desired or effective method. For example, a chromogenic compound having a different counterion or in the free acid form can be obtained commercially and the counterion can be replaced with the desired counterion. Metallizing azo dyes can be done by any desired or effective method, such as that described in, for example, "British Intelligence Objectives Subcommittee Report 961," Publications Board No. 86139, Library of Congress, Washington, D.C. 1947, pp. 71-72, 110, 149-151, 160, 163, 164, the disclosure of which is totally incorporated herein by reference. The desired counterions can generally be derived from commercially available amine compounds as well. Primary, secondary, and tertiary amines can also be prepared as described in, for example, *Comprehensive Organic Transformations—A Guide to Functional Group Preparations*, $2^{nd}$ Ed., Richard C. Larock, Wiley-VCH, 1999 ISBN 0-471-19031-4 New York, N.Y., the disclosure of which is totally incorporated herein by reference.

For example, in one embodiment, the chromogenic compound and the amine compound from which the counterion is to be derived can be heated together until the ion exchange is complete, followed by distilling off the solvent (if a solvent is used) and recovery of the colorant compound thus prepared.

Any desired or effective relative amounts of the chromogenic compound and the amine compound from which the counterion is to be derived can be employed. When the charge on the chromogenic compound is −1, the relative amounts can be, for example, in one embodiment at least about 0.1 mole of chromogenic compound per every one mole of amine compound, in another embodiment at least about 0.5 mole of chromogenic compound per every one mole of amine compound, and in yet another embodiment at least about 0.9 mole of chromogenic compound per every one mole of amine compound, and in one embodiment no more than about 3 moles of chromogenic compound per every one mole of amine compound, in another embodiment no more than about 2 moles of chromogenic compound per every one mole of amine compound, and in yet another embodiment no more than about 1.1 moles of chromogenic compound per every one mole of amine compound, although the relative amounts can be outside of these ranges. When the charge on the chromogenic compound is −2, the amount of amine compound will, of course be doubled, and when the charge on the chromogenic compound is higher, the amount of amine compound will, of course, be adjusted accordingly.

When a solvent is used, any desired or effective solvent can be employed. Examples of suitable solvents include methyl isobutyl ketone, methyl ethyl ketone, acetone, methanol, ethanol, n-propanol, isopropanol, butanol, and the like, as well as mixtures thereof.

The reactants are present in the solvent in any desired or effective amount, in one embodiment at least about 1 gram of reactants per liter of solvent, in another embodiment at least about 225 grams of reactants per liter of solvent, and in yet another embodiment at least about 450 grams of reactants per liter of solvent, and in one embodiment no more than about 2,000 grams of reactants per liter of solvent, in another embodiment no more than about 1,000 grams of reactants per liter of solvent, and in yet another embodiment no more than about 500 grams of reactants per liter of solvent, although the relative amounts of reactants and solvent can be outside of these ranges.

The reactants can be heated to any desired or effective temperature, in one embodiment at least about 25° C., in another embodiment at least about 65° C., and in yet another embodiment at least about 110° C., and in one embodiment no more than about 150° C., in another embodiment no more than about 125° C., and in yet another embodiment no more than about 110° C., although the temperature can be outside of these ranges.

The reactants can be heated for any desired or effective period of time, in one embodiment at least about 1 hour, in another embodiment at least about 12 hours, and in yet another embodiment at least about 16 hours, and in one embodiment no more than about 7 days, in another embodiment no more than about 1 day, and in yet another embodiment no more than about 18 hours, although the period of time can be outside of these ranges.

Thereafter, the colorant compound thus prepared can be recovered by any desired or effective method, such as by distillation, vacuum, quenching into a solvent in which the product is not soluble (such as water), or the like.

The colorant compound is present in the ink in any desired or effective amount, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 25 percent by weight of the ink, and in yet another embodiment no more than about 20 percent by weight of the ink, although the amount can be outside of these ranges.

The inks disclosed herein also comprise a branched triamide. Branched triamides are disclosed in, for example, U.S. Pat. No. 6,860,930, the disclosure of which is totally incorporated herein by reference. By "branched triamide" is meant that the structure of the triamide can be drawn so that each amide group is bonded to an atom or group of atoms contained in a branch other than that of the others, and that each amide group is in a different branch. By "each amide group is in a different branch" is meant that the triamide is not linear; by "linear" is meant a molecule wherein all three amide groups can be drawn as being in the same molecular chain or branch, such as linear triamides of the formulae

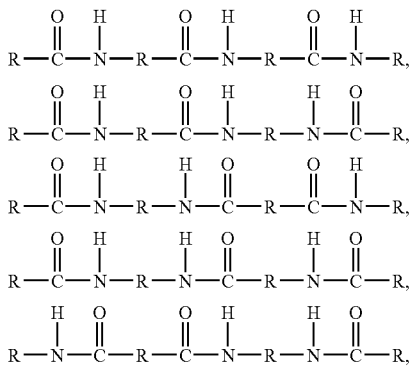

or the like. For purposes of the present invention, linear triamides include those wherein a line can be drawn through the three amide groups, even if one would ordinarily draw a different line. For example, a compound of the formula

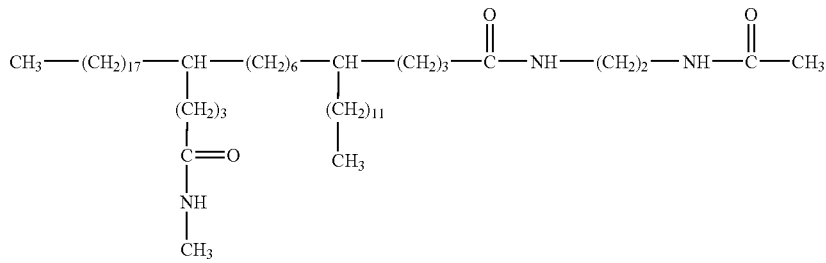

is considered a linear compound for purposes of the present invention, because it can also be drawn as follows:

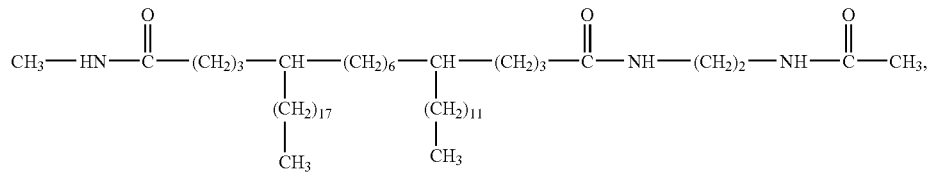

and accordingly would not be considered to be a branched triamide for the purposes of the inks discloses herein. For purposes of the inks disclosed herein, "branched triamines", "branched triacids", "branched monoamino diacids", and "branched diamino monoacids" have similar definitions in that each of the three functional groups named can be drawn as being in a different branch from the other two.

Examples of suitable branched triamides include (but are not limited to) those generated from branched triamines, said branched triamides being of the formula

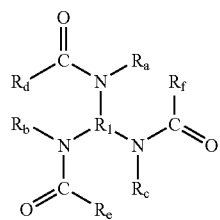

wherein $R_1$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_a$, $R_b$, and $R_c$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 7 carbon atoms, and in yet another embodiment with at least about 10 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_d$, $R_e$, and $R_f$ each, independently of the others, is (i) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 17 carbon atoms, and in yet another embodiment with at least about 36 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched triacids, said branched triamides being of the formula

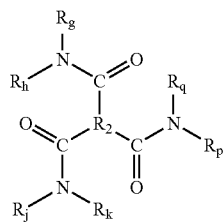

wherein $R_2$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, cyclic, and/or acyclic, and wherein hetero atoms, such as oxygen, nitrogen, sulfur, silicon, phosphorus, boron, and the like either may or may not be; present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_g$, $R_j$, and $R_p$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least about 1 carbon atom, in another embodiment with at least about 2 carbon atoms, in yet another embodiment with at least about 3 carbon atoms, in another embodiment with at least about 6 carbon atoms, and in yet another embodiment with at least about 18 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_h$, $R_k$, and $R_q$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least about 1 carbon atom, in another embodiment with at least about 2 carbon atoms, in yet another embodiment with at least about 3 carbon atoms, in another embodiment with at least about 4 carbon atoms, and in yet another embodiment with at least about 5 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched diamino monoacid compounds, said branched triamides being of the formula

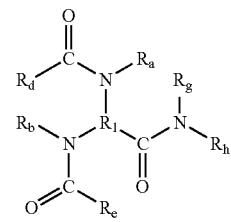

wherein $R_1$, $R_a$, $R_b$, $R_d$, $R_e$, $R_g$, and $R_h$ are as defined hereinabove, those generated from branched monoamino diacid compounds, said branched triamides being of the formula

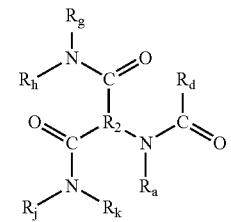

wherein $R_2$, $R_a$, $R_d$, $R_g$, $R_h$, $R_j$, and $R_k$ are as defined hereinabove, and the like, wherein the substituents on the substituted alkyl, alkylene, aryl, arylene, arylalkyl, arylalkylene, alkylaryl, and alkylarylene groups can be (but are not limited to) hydroxy groups, halogen atoms, imine groups, ammonium groups, cyano groups, pyridine groups, pyridinium groups, ether groups, aldehyde groups, ketone groups, ester groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, carboxylate groups, mixtures thereof, and the like, wherein two or more substituents can be joined together to form a ring.

In one specific embodiment, when the triamide is of the formula

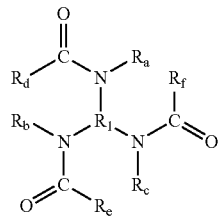

the total number of carbon atoms in $R_1+R_a+R_b+R_c+R_d+R_e+R_f$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_b$, $R_e$, $R_c$, and $R_f$, independently of the others, has no more than about 50 carbon atoms, and in yet another specific embodiment no more than about 48 carbon atoms, although the number of carbon atoms can be outside of these ranges.

In one specific embodiment, when the triamide is of the formula

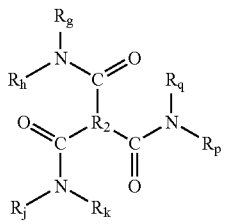

the total number of carbon atoms in $R_2+R_g+R_h+R_j+R_k+R_p+R_q$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_g$, $R_h$, $R_j$, $R_k$, $R_p$, and $R_q$, independently of the others, has no more than about 50 carbon atoms, and in yet another specific embodiment no more than about 48 carbon atoms, although the number of carbon atoms can be outside of these ranges.

In one specific embodiment, when the triamide is of the formula

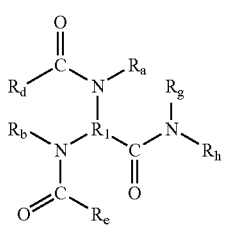

the total number of carbon atoms in $R_1+R_a+R_b+R_d+R_e+R_g+R_h$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_b$, $R_e$, $R_g$, and $R_h$, independently of the others, has no more than about 50 carbon atoms, and in yet another specific embodiment no more than about 48 carbon atoms, although the number of carbon atoms can be outside of these ranges.

In one specific embodiment, when the triamide is of the formula

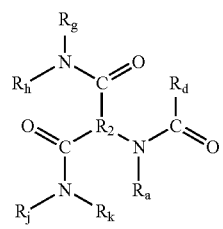

the total number of carbon atoms in $R_2+R_a+R_d+R_g+R_h+R_j+R_k$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_g$, $R_h$, $R_j$, and $R_k$, independently of the others, has no more than about 50 carbon atoms, and in yet another specific embodiment no more than about 48 carbon atoms, although the number of carbon atoms can be outside of these ranges.

It must be emphasized that not all of the amide groups in the first formula need to be directly bonded to the same atom in the $R_1$ or $R_2$ group, and in one specific embodiment of the present invention, each amide group is bonded to a different atom in the $R_1$ or $R_2$ group.

In one specific embodiment, the branched triamide is of the formula

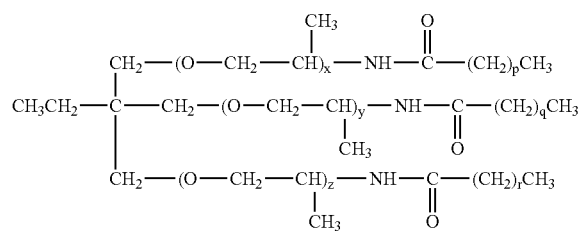

wherein x, y, and z each, independently represent the number of propyleneoxy repeat units and x+y+z is from about 5 to about 6, and wherein p, q, and r each, independently of the others, are integers representing the number of repeat —($CH_2$)— units and are in one embodiment at least about 15, in another embodiment is at least about 20, and in another embodiment is at least about 26, and are one embodiment no more than about 60, in another embodiment are no more than about 55, and are in yet another embodiment no more than about 45, although the value of p, q, and r can be outside of these ranges. The triamide composition is frequently obtained as a mixture of materials, wherein p, q, and r are each peak average chain length numbers within the composition, rather than uniform compositions wherein each molecule has the same value for p, q, and r, and it must be understood that within the mixture, some individual chains may be longer or shorter than the given numbers.

The triamide is present in the ink in any desired or effective amount, in one embodiment at least about 2 percent by weight of the phase change ink carrier, in another embodiment at least about 5 percent by weight of carrier, and in yet another embodiment at least about 10 percent by weight of the carrier, and in one embodiment no more than about 50 percent by weight of the carrier, in another embodiment no more than about 40 percent by weight of the carrier, and in yet another embodiment no more than about 35 percent by weight of the carrier, although the amount can be outside of these ranges.

The phase change inks disclosed herein also contain a polyethylene wax. This polyethylene wax has an average peak molecular weight, as measured by high temperature gel permeation chromatography, of in one embodiment at least about 350, in another embodiment at least about 400, and in yet another embodiment at least about 470, and in one embodiment no more than about 730, in another embodiment no more than about 700, and in yet another embodiment no more than about 600, although the average peak molecular weight can be outside of these ranges.

The polyethylene wax has a polydispersity (determined by dividing weight average molecular weight by number average molecular weight) in one embodiment of at least about 1.0001, and in one embodiment of no more than about 1.5, in another embodiment of no more than about 1.4, in yet another embodiment of no more than about 1.3, in still another embodiment of no more than about 1.2, in another embodiment of no more than about 1.1, and in yet another embodiment of no more than about 1.05, although the polydispersity can be outside of these ranges.

The polyethylene wax has a peak melting point (as measured by differential scanning calorimetry (DSC)) in one embodiment of at least about 50° C., in another embodiment at least about 60° C., and in yet another embodiment of at least about 70° C., and in one embodiment of no more than about 130° C., in another embodiment of no more than about 125° C., and in yet another embodiment of no more than about 120° C., although the peak melting point can be outside of these ranges.

The polyethylene wax has an onset melting point (as measured by differential scanning calorimetry (DSC)) in one embodiment of at least about 50° C., in another embodiment at least about 52° C., and in yet another embodiment of at least about 55° C., and in one embodiment of no more than about 71° C., in another embodiment of no more than about 70° C., and in yet another embodiment of no more than about 69° C., although the onset melting point can be outside of these ranges.

The polyethylene wax has a melting range, which is defined as the difference between ending melting point and onset melting point as defined in ASTM D3418-03, in one embodiment of at least about 5° C., in another embodiment at least about 8° C., and in yet another embodiment of at least about 10° C., and in one embodiment of no more than about 40° C., in another embodiment of no more than about 35° C., and in yet another embodiment of no more than about 30° C., although the melting range can be outside of these ranges.

The polyethylene wax has a freezing point (as measured by differential scanning calorimetry (DSC)) in one embodiment of at least about 40° C., in another embodiment at least about 50° C., and in yet another embodiment of at least about 55° C., and in one embodiment of no more than about 80° C., in another embodiment of no more than about 75° C., and in yet another embodiment of no more than about 70° C., although the freezing point can be outside of these ranges.

The polyethylene wax has a viscosity at about 110° C. in one embodiment of at least about 3 centipoise, in another embodiment of at least about 4 centipoise, and in yet another embodiment of at least about 4.5 centipoise, and in one embodiment of no more than about 10 centipoise, in another embodiment of no more than about 9 centipoise, and in yet another embodiment of no more than about 8 centipoise, although the viscosity can be outside of these ranges.

By "average peak molecular weight" is meant that the polyethylene wax, while comprising a mixture of molecules of the formula —$(CH_2)_n$— wherein n is an integer representing the number of repeat —$CH_2$— units, has a distribution of molecules such that a plot of the relative amount of molecules versus the retention time or molecular weight would appear as a bell curve, wherein the peak of the bell curve represents the average peak molecular weight. In contrast, polyethylene waxes having a different average peak molecular weight value, while they may contain materials that overlap in the value of "n", will have different characteristics.

Shown in the Figure are measurements of molecular weight taken for some polyethylene waxes by high temperature gel permeation chromatography with a Polymer Labs 220HT system using refractive index detection, a mobile phase of 1,2,4-trichlorobenzene, and two Polymer 3 μm Mixed-E columns for separation. The entire system and the sample solution before injection were heated to 140° C. The molecular weights were characterized using polyethylene standards for calibration. One material was a polyethylene wax commercially available from Baker Petrolite, Tulsa, Okla., being POLYWAX 500 (PE 500). Also measured was a polyethylene wax commercially available from Baker Petrolite, Tulsa, Okla., being POLYWAX 655 (PE 655). Also measured was a polyethylene wax which was obtained from Baker Petrolite, Tulsa, Okla., being similar to POLYWAX 500 but which was distilled to remove both the lowest 15 percent molecular weight fraction and the highest 15 percent molecular weight fraction. This distillation can be carried out as described in, for example, U.S. Patent Publication 2005/0130054, the disclosure of which is totally incorporated herein by reference. Some of the data for the retention times of these materials were as follows. Note that in this instance, the x-axis is "reversed" in that the high molecular weight materials appear on the left and the low molecular weight materials appear on the right. Negative numbers are attributable to instrument calibration, and data on the y-axis reflect relative amounts.

| retention times (sec.) | PE 500 | lowest 15% removed and highest 15% removed | PE 655 |
|---|---|---|---|
| 750 | 0.1 | −0.9 | −0.7 |
| 755 | 0.2 | −0.9 | −0.6 |
| 760 | 0.2 | −0.9 | −0.4 |
| 765 | 0.2 | −0.9 | −0.1 |
| 770 | 0.3 | −0.9 | 0.1 |
| 775 | 0.3 | −0.9 | 0.6 |
| 780 | 0.4 | −0.9 | 1.2 |
| 785 | 0.6 | −0.9 | 2.1 |
| 790 | 0.8 | −0.9 | 3.6 |
| 795 | 1.0 | −1.0 | 6.0 |

-continued

| retention times (sec.) | PE 500 | lowest 15% removed and highest 15% removed | PE 655 |
|---|---|---|---|
| 800 | 1.3 | −1.0 | 9.7 |
| 805 | 1.8 | −1.0 | 14.8 |
| 810 | 2.3 | −1.0 | 21.8 |
| 815 | 3.2 | −1.0 | 30.6 |
| 820 | 4.5 | −1.0 | 41.1 |
| 825 | 6.3 | −0.9 | 52.6 |
| 830 | 8.9 | −0.9 | 64.5 |
| 835 | 12.6 | −0.7 | 75.9 |
| 840 | 17.6 | −0.3 | 85.8 |
| 845 | 24.1 | 0.6 | 93.5 |
| 850 | 32.0 | 2.8 | 98.3 |
| 855 | 41.3 | 7.0 | 100.0 |
| 860 | 51.4 | 14.4 | 98.6 |
| 865 | 61.9 | 26.0 | 94.3 |
| 870 | 72.2 | 41.3 | 87.8 |
| 875 | 81.7 | 58.7 | 79.7 |
| 880 | 89.6 | 75.3 | 70.6 |
| 885 | 95.5 | 78.2 | 61.2 |
| 890 | 99.0 | 81.0 | 52.0 |
| 891 | 99.4 | 86.1 | 50.3 |
| 895 | 100.0 | 88.4 | 43.4 |
| 900 | 98.6 | 96.6 | 35.7 |
| 905 | 95.0 | 97.7 | 28.7 |
| 910 | 89.7 | 99.9 | 22.8 |
| 910.5 | 89.1 | 100.0 | 22.2 |
| 915 | 82.8 | 98.5 | 17.9 |
| 920 | 75.0 | 93.4 | 13.9 |
| 925 | 67.4 | 84.9 | 10.5 |
| 930 | 58.8 | 83.9 | 8.0 |
| 935 | 51.2 | 73.2 | 5.7 |
| 940 | 43.9 | 60.1 | 4.3 |
| 945 | 36.7 | 46.3 | 2.9 |
| 950 | 31.3 | 32.7 | 2.0 |
| 955 | 25.2 | 22.0 | 1.2 |
| 960 | 21.4 | 13.2 | 0.8 |
| 965 | 16.9 | 7.7 | 0.2 |
| 970 | 13.5 | 3.9 | 0.1 |
| 975 | 11.4 | 2.0 | −0.3 |
| 980 | 7.4 | 0.7 | −0.4 |
| 985 | 6.8 | 0.1 | −0.6 |
| 990 | 4.4 | −0.4 | −0.8 |
| 995 | 2.9 | −0.6 | −0.7 |
| 1000 | 2.6 | −0.8 | −0.9 |
| 1005 | 1.5 | −0.9 | −0.9 |
| 1010 | 0.9 | −1.0 | −0.9 |
| 1015 | 0.9 | −1.0 | −0.9 |
| 1020 | 0.6 | −1.0 | −1.1 |
| 1025 | 0.4 | −1.1 | −1.1 |
| 1030 | 0.4 | −1.1 | −1.5 |
| 1035 | 0.7 | −1.1 | −2.0 |
| 1040 | 0.9 | −1.1 | −2.2 |
| 1045 | 0.8 | −1.2 | −1.6 |

As measured by high temperature gel permeation chromatography, the peak average molecular weight ($M_p$), number average molecular weight ($M_n$), weight average molecular weight ($M_w$), and polydispersity (MWD) as measured by high temperature gel permeation chromatography for these waxes were as follows:

| | $M_p$ | $M_n$ | $M_w$ | MWD |
|---|---|---|---|---|
| PE 500 | 572 | 516 | 570 | 1.10 |
| lowest 15% removed and highest 15% removed | 582 | 562 | 579 | 1.03 |
| PE 655 | 795 | 729 | 785 | 1.08 |

Peak melting point (° C., as measured by differential scanning calorimetry using a DUPONT 2100 calorimeter according to ASTM D 3418-03), onset melting point (° C., as measured by differential scanning calorimetry), viscosity at 110° C. (centipoise, measured using a Rheometric Scientific DSR-2000 cone-plate rheometer), and freezing point (° C., as measured by differential scanning calorimetry) of the high temperature gel permeation chromatography data of these waxes were as follows:

| | peak MP | onset MP | melting range | viscosity | FP |
|---|---|---|---|---|---|
| PE 500 | 81.2 | 52.5 | 42.2 | 5.44 | 70.3 |
| lowest 15% removed and highest 15% removed | 83.8 | 65.5 | 24.1 | 5.18 | 67.4 |
| PE 655 | 94.6 | 72.3 | 29.6~33.0 | 9.80 | 85.5 |

Melted liquid clearness of the waxes was evaluated by melting samples of the waxes in glass jars and keeping them in an oven at various temperatures, followed by checking them with the naked eye for clearness versus the presence of precipitates over time. The results were as follows:

| | PE 500 | PE 655 | lowest 15% removed and highest 15% removed |
|---|---|---|---|
| 1 day at 120° C. | clear | a little precipitate | clear |
| 3 days at 110° C. | a little precipitate | a little precipitate | clear |
| 6 days at 105° C. | a little precipitate | some precipitate | clear |
| 11 days at 100° C. | a little precipitate | some precipitate | clear |

The results clearly indicate the advantage of the wax having had both the low molecular weight fraction and the high molecular weight fraction removed over the undistilled commercial waxes in that no precipitates form therein even after 11 days.

The polyethylene wax in the inks disclosed herein have had some of the lowest molecular weight fraction removed therefrom and some of the highest molecular weight fraction removed therefrom, in one embodiment at least about the lowest 5 percent molecular weight fraction removed therefrom, in another embodiment at least about the lowest 7.5 percent molecular weight fraction removed therefrom, in yet another embodiment at least about the lowest 10 percent molecular weight fraction removed therefrom, in still another embodiment, at least about the lowest 12.5 molecular weight fraction removed therefrom, and in yet still another embodiment at least about the lowest 15 percent molecular weight fraction removed therefrom, and in one embodiment least about the highest 5 percent molecular weight fraction removed therefrom, in another embodiment at least about the highest 7.5 percent molecular weight fraction removed therefrom, in yet another embodiment at least about the highest 10 percent molecular weight fraction removed therefrom, in still another embodiment, at least about the highest 12.5 molecular weight fraction removed therefrom, and in yet still another embodiment at least about the highest 15 percent molecular weight fraction removed therefrom, although the amount removed therefrom can be outside of these ranges.

The lowest molecular weight fraction and the highest molecular weight fraction can be removed from the polyethylene wax by any desired or effective method, including (but not limited to) the distillation methods described in U.S. Patent Publication 2005/0130054, the disclosure of which is totally incorporated herein by reference, the purification methods set forth in application Ser. No. 11/126,745, the disclosure of which is totally incorporated herein by reference, or the like.

The polyethylene wax is present in the ink in any desired or effective amount, in one embodiment at least about 10 percent by weight of the phase change ink carrier, in another embodiment at least about 20 percent by weight of carrier, and in yet another embodiment at least about 30 percent by weight of the carrier, and in one embodiment no more than about 90 percent by weight of the carrier, in another embodiment no more than about 85 percent by weight of the carrier, and in yet another embodiment no more than about 80 percent by weight of the carrier, although the amount can be outside of these ranges.

Additional examples of suitable phase change ink carrier materials are monoamides, tetra-amides, mixtures thereof, and the like. Specific examples of suitable fatty amide ink carrier materials include stearyl stearamide, such as KEMAMIDE S-180, available from Crompton Corporation, Greenwich, Conn., and the like. Further information on fatty amide carrier materials is disclosed in, for example, U.S. Pat. Nos. 4,889,560, 4,889,761, 5,194,638, 4,830,671, 6,174,937, 5,372,852, 5,597,856, 6,174,937, and British Patent GB 2 238 792, the disclosures of each of which are totally incorporated herein by reference. In one specific embodiment, a monoamide is present in the ink carrier in an amount in one embodiment of at least about 0.01 percent by weight of the carrier, in another embodiment of at least 2 percent by weight of the carrier, and in yet another embodiment of at least about 5 percent by weight of the carrier, and in one embodiment of no more than about 90 percent by weight of the carrier, in another embodiment of no more than about 80 percent by weight of the carrier, and in yet another embodiment of no more than about 70 percent by weight of the carrier, although the amount can be outside of these ranges.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

In one specific embodiment, the ink can contain a urethane resin obtained from the reaction of two equivalents of ABITOL® E hydroabietyl alcohol (available from Hercules Inc., Wilmington, Del.) and one equivalent of isophorone diisocyanate, prepared as described in Example 1 of U.S. Pat. No. 5,782,966, the disclosure of which is totally incorporated herein by reference. When present, this resin is present in the ink in one embodiment in an amount of at least about 2 percent by weight of the ink carrier, in another embodiment at least about 3 percent by weight of the ink carrier, and in yet another embodiment at least about 5 percent by weight of the ink carrier, and in one embodiment no more than about 80 percent by weight of the ink carrier, in another embodiment no more than about 70 percent by weight of the ink carrier, and in yet another embodiment no more than about 60 percent by weight of the ink carrier, although the amount can be outside of these ranges.

In another specific embodiment, the ink can contain a urethane resin that is the adduct of three equivalents of stearyl isocyanate and a glycerol-based alcohol prepared as described in Example 4 of U.S. Pat. No. 6,309,453, the disclosure of which is totally incorporated herein by reference. When present, this resin is present in the ink in one embodiment in an amount of at least about 0.5 percent by weight of the ink carrier, in another embodiment at least about 1 percent by weight of the ink carrier, and in yet another embodiment at least about 2 percent by weight of the ink carrier, and in one embodiment no more than about 40 percent by weight of the ink carrier, in another embodiment no more than about 35 percent by weight of the ink carrier, and in yet another embodiment no more than about 30 percent by weight of the ink carrier, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

In one specific embodiment, the colorant is present in combination with Disperse Orange 47 dye. In this embodiment, the ratio of this colorant to Disperse Orange 47 can be any ratio desired to obtain the desired color or hue, in one embodiment at least about 0.01 part by weight Disperse Orange 47 per every one part by weight colorant as disclosed herein, in another embodiment at least about 0.05 part by weight Disperse Orange 47 per every one part by weight colorant as disclosed herein, and in yet another embodiment at least about 0.1 part by weight Disperse Orange 47 per every one part by weight colorant as disclosed herein, and in one embodiment no more than about 1 part by weight Disperse Orange 47 per every one part by weight colorant as disclosed herein, in another embodiment no more than about 0.8 part by weight Disperse Orange 47 per every one part by weight colorant as disclosed herein, and in yet another embodiment no more than about 0.5 part by weight Disperse Orange 47 per every one part by weight colorant as disclosed herein, although the relative amounts can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions in one embodiment have peak melting points of no lower than about 50° C., in another embodiment of no lower than about 60° C., and in yet another embodiment of no lower than about 70° C., and have melting points in one embodiment of no higher than about 160° C., in another embodiment of no higher than about 140° C., and in yet another embodiment of no higher than about 100° C., although the peak melting point can be outside of these ranges.

The ink compositions generally have melt viscosities at the jetting temperature (in one embodiment no lower than about 75° C., in another embodiment no lower than about 85° C., and in yet another embodiment no lower than about 95° C., and in one embodiment no higher than about 150° C., and in another embodiment no higher than about 120° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 110, 115, and/or 120° C.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

To a 2-liter 3-necked round bottom flask equipped with TEFLON® coated magnet, silicone oil bath, magnetically stirred hot plate, and condenser was charged 1,100 g methyl isobutyl ketone (obtained from Aldrich Chemical Co., Milwaukee, Wis.). Stirring was initiated and Solvent Black 45 free acid dye (about 250 g, 0.275 moles, obtained from Orient Chemical Industries Ltd, Osaka, Japan), of the formula

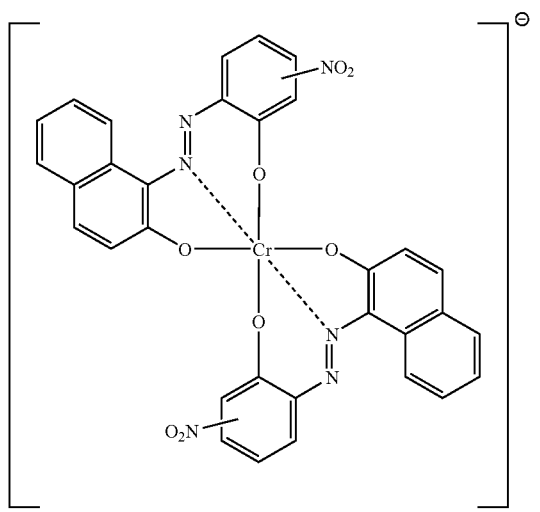

was added to the flask. The oil bath was heated to 120° C. for about 2 hours until the dye was completely dissolved. About 196.3 g (0.20 moles) of distearyl amine (ARMEEN® 2HT, obtained from Akzo Nobel, McCook, Ill.) was subsequently added, and the reaction mixture was then refluxed for about 16 hours. A distillation setup was subsequently attached and the solvent was distilled off with the aid of a nitrogen inlet. When the distillation appeared complete, vacuum was applied to the system. The vacuum was gradually increased to prevent foaming and was held for about 16 hours at 120° C. The flask was then transferred to an oven at 120° C. and secured upside down, and the product was collected. The product was believed to be of the formula

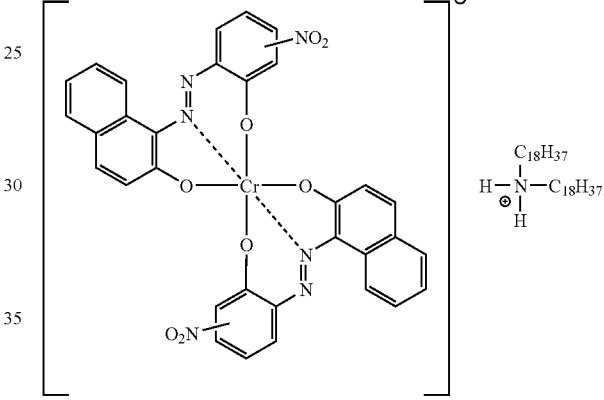

EXAMPLE II

To a 100-milliliter 3-necked round bottom flask equipped with TEFLON® coated magnet, silicone oil bath, magnetically stirred hot plate, and condenser was charged 75 g methyl isobutyl ketone (obtained from Aldrich Chemical Co., Milwaukee, Wis.). Stirring was initiated and Solvent Black 45 free acid dye (about 10 g, 0.015 moles, obtained from Orient Chemical Industries Ltd, Osaka, Japan) was added to the flask. The oil bath was heated to 120° C. for about 0.5 hours until the dye was completely dissolved. About 6.2 g (0.015 moles) of PA28 (obtained from Tomah Products Inc., Milton, Wis.) was subsequently added, and the reaction mixture was then refluxed for about 16 hours. A distillation setup was thereafter attached and the solvent was distilled off with the aid of a nitrogen inlet. When the distillation appeared complete, the flask was then transferred to an oven at 120° C. and secured upside down for about 1 hour, and the product was collected. The product was believed to be of the formula

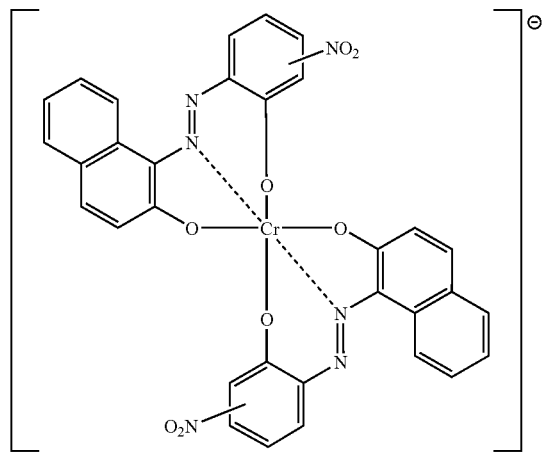
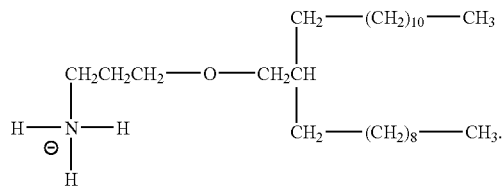

EXAMPLE III

The process of Example II was repeated except that about 5.11 g (0.015 moles) of SA19.3 (obtained from Tomah Products Inc., Milton, Wis.) was substituted for the 6.2 g (0.015 moles) of PA28. The product was believed to be of the formula

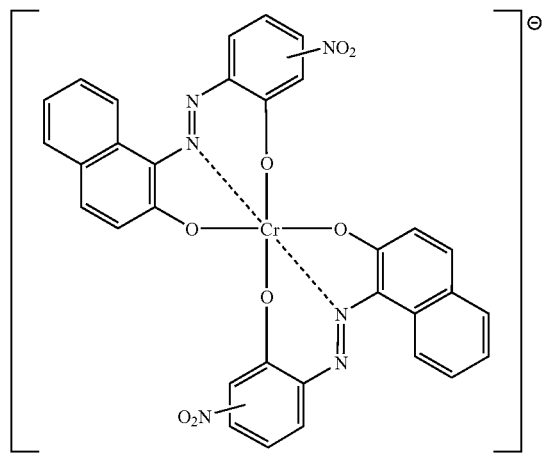
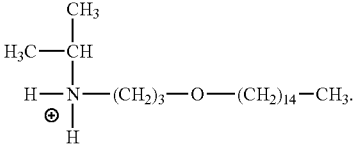

EXAMPLE IV

To a 100-milliliter 3-necked round bottom flask equipped with TEFLON® coated magnet, silicone oil bath, magnetically stirred hot plate, and condenser was charged 35 g methyl isobutyl ketone (obtained from Aldrich Chemical Co., Milwaukee, Wis.). Stirring was initiated and Solvent Black 45 free acid dye (about 5 g, 0.0075 moles, obtained from Orient Chemical Industries Ltd, Osaka, Japan) was added to the flask. The oil bath was heated to 120° C. for about 0.5 hours until the dye was completely dissolved. About 2.9 g (0.0075 moles) of PROPOMEEN O/12 (obtained from Akzo Nobel, McCook, Ill.) was subsequently added, and the reaction mixture was then refluxed for about 16 hours. A distillation setup was thereafter attached and the solvent was distilled off with the aid of a nitrogen inlet. When the distillation appeared complete, the flask was then transferred to an oven at 120° C. and secured upside down for about 1 hour, and the product was collected. The product was believed to be of the formula

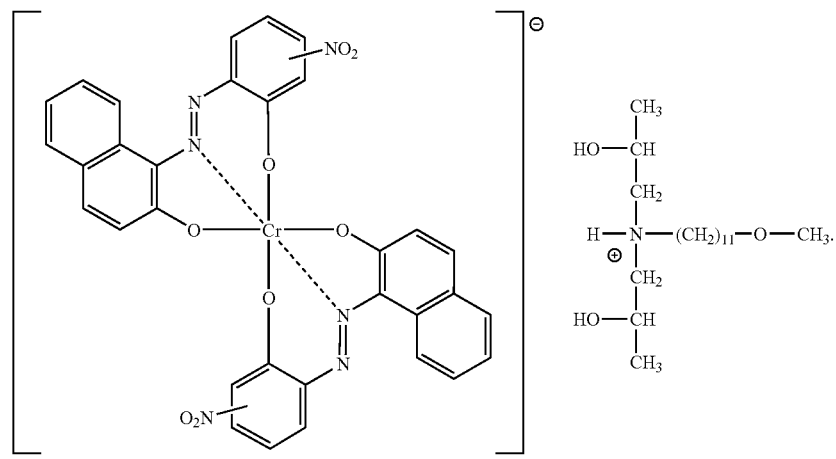

EXAMPLE V

The process of Example II was repeated except that about 10.3 g (0.015 moles) of trihexadecylamine (ARMEEN® 316 obtained from Akzo Nobel, McCook, Ill.) was substituted for the 6.2 g (0.015 moles) of PA28. The product was believed to be of the formula

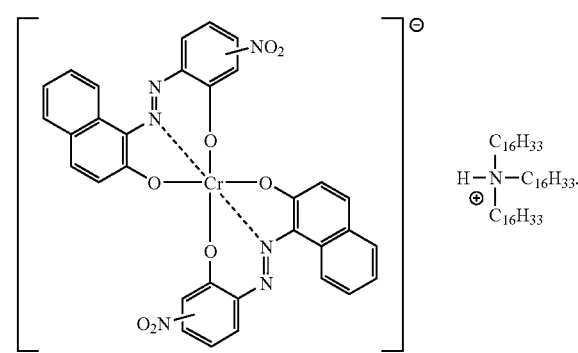

EXAMPLE VI

The process of Example II was repeated except that about 7.8 g (0.015 moles) of tridodecylamine (ARMEEN® 312 obtained from Akzo Nobel, McCook, Ill.) was substituted for the 6.2 g (0.015 moles) of PA28. The product was believed to be of the formula

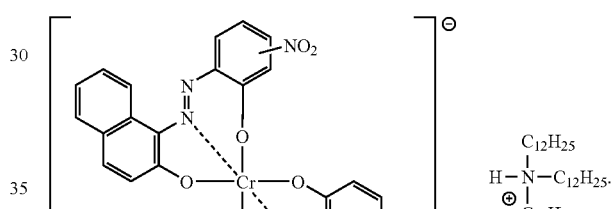

EXAMPLE VII

The processes of Examples I through VI are repeated using CI 12695 as the free acid dye instead of Solvent Black 45 (CI 12195). It is believed that similar results will be obtained.

EXAMPLE VIII

The processes of Examples I through VI are repeated using CI 12696 as the free acid dye instead of Solvent Black 45 (CI 12195). It is believed that similar results will be obtained.

EXAMPLE IX

The processes of Examples I through VI are repeated using CI 12716 as the free acid dye instead of Solvent Black 45 (CI 12195). It is believed that similar results will be obtained.

EXAMPLE X

The processes of Examples I through VI are repeated using CI 11836 as the free acid dye instead of Solvent Black 45 (CI 12195). It is believed that similar results will be obtained.

EXAMPLE XI

The processes of Examples I through VI are repeated using CI 12196 as the free acid dye instead of Solvent Black 45 (CI 12195). It is believed that similar results will be obtained.

EXAMPLE XII

The processes of Examples I through VI are repeated using CI 12205 as the free acid dye instead of Solvent Black 45 (CI 12195). It is believed that similar results will be obtained.

EXAMPLE XIII

Ink compositions were prepared by the following process. All ink ingredients except colorant(s) were charged into a stainless steel beaker. The resulting mixture was then melted together at a temperature of about 110° C. in an oven, followed by blending by stirring in a temperature controlled mantle at about 110° C. for about 0.3 hour. To this mixture was then added the colorant(s). After stirring for about 2 additional hours, the ink thus formed was filtered through a heated MOTT® apparatus (obtained from Mott Metallurgical) using Whatman #3 filter paper under a pressure of about 15 pounds per square inch. The filtered phase change ink thus formed was poured into molds and allowed to solidify to form ink sticks. Inks were prepared from the following ingredients: polyethylene wax, $M_p$=572, $M_n$=516, $M_w$=570, $M_{wd}$=1.10 as measured by HT-GPC (PE 500, obtained from Baker Petrolite, Tulsa, Okla.); narrow molecular weight distribution polyethylene wax, distilled to remove about 15 percent of the lower molecular weight fraction and about 15 percent of the upper molecular weight fraction, $M_p$=582, $M_n$=562, $M_w$=579, $M_{wd}$=1.03 as measured by HT-GPC (obtained from Baker Petrolite, Tulsa, Okla.); a branched triamide of the formula

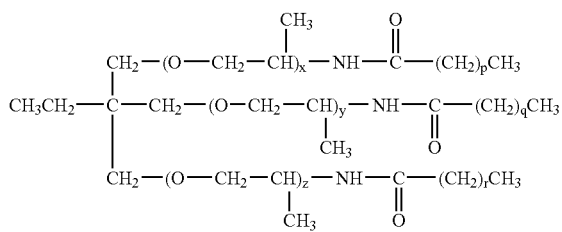

wherein p, q, and r each have an average value of about 35, prepared as described in Example II of U.S. Pat. No. 6,860,930, the disclosure of which is totally incorporated herein by reference; stearyl stearamide wax (KEMAMIDE® S-180, obtained from Crompton Corporation, Greenwich, Conn.); KE-100 Resin (triglycerides of hydrogenated abietic (rosin) acid, obtained from Arakawa Chemical Industries (USA) Inc., Chicago, Ill.); a urethane resin that was the adduct of three equivalents of stearyl isocyanate and a glycerol-based alcohol, prepared as described in Example 4 of U.S. Pat. No. 6,309,453, the disclosure of which is totally incorporated herein by reference; NAUGUARD® 445 antioxidant (obtained from Uniroyal Chemical Co., Middlebury, Conn.); Disperse Orange 47 dye, obtained as DO-47 from Keystone Aniline Corporation, Chicago, Ill.; Solvent Black 45 dye, obtained as TELASOL BLACK K45 from Clariant Corp., Charlotte, N.C.; and the black dye prepared as described in Example I above. The amounts in percent by weight of the ink of each ingredient are listed in the table below for each ink:

|  | Ink A | Ink B | Ink 1 | Ink 2 |
|---|---|---|---|---|
| PE 500 | 52.28 | 56.44 | 0 | 0 |
| narrow wax | 0 | 0 | 52.28 | 55.43 |
| triamide | 12.29 | 11.20 | 12.29 | 11.00 |
| S-180 | 15.03 | 13.77 | 15.03 | 13.53 |
| KE-100 | 10.86 | 9.88 | 10.86 | 9.70 |
| urethane resin | 4.37 | 4.03 | 4.37 | 3.96 |
| N-445 | 0.17 | 0.18 | 0.17 | 0.18 |
| DO-47 | 0.20 | 0.20 | 0.20 | 0.20 |
| SK45 dye | 0 | 4.30 | 0 | 0 |
| Example I dye | 4.80 | 0 | 4.80 | 6.00 |

Inks A and B are provided for comparative purposes.

Ink Characteristics

Various characteristics of the inks were measured and are indicated in the table below. Viscosity (η, centipoise) was measured by a Rheometrics DSR-2000 cone-plate rheometer at 110° C. The spectral strength (SS in A*mL/g) at various wavelengths was determined using a spectrophotographic procedure based on the measurement of the ink absorption in solution by dissolving the ink in n-butanol and measuring the absorbance using a Perkin Elmer Lambda 2S UV/VIS spectrophotometer. Glass transition temperature ($T_g$ in ° C.) was measured by Dynamic Mechanic Analysis using a Rheometrics Solid Analyzer (RSA II). Peak melting point (MP in ° C.) and peak freezing point (FP in ° C.) were measured by differential scanning calorimetry (DSC) using a DUPONT 2100 calorimeter. To evaluate the dye solubility in the ink base, spectral strengths at 580 nm of the inks were used as the measurement of dye solubility in the filtered and unfiltered inks. Any undissolved dye in the ink was filtered out, resulting in the smaller spectral strength of the filtered ink compared to that of the unfiltered ink. Accordingly, the ratio of the filtered ink's spectral strength to the unfiltered ink's spectral strength ("SS ratio") is a measure of dye solubility; to the degree that the SS ratio is significantly less than 1, it indicates poor solubility of the dye in the ink base.

|  | Ink A | Ink B | Ink 1 | Ink 2 |
|---|---|---|---|---|
| η | 10.83 | 9.44 | 10.71 | 10.37 |
| $T_g$ | 11.8 | — | 10.1 | 10.3 |
| MP | 80.2 | 79.2 | 80.5 | 80.2 |
| FP | 68.7, 74.5 | 71.2, 73.1 | 67.9 | 67.4 |
| SS at 380 nm unfiltered | 812 | 1818 | 808 | 1022 |
| SS at 380 nm filtered | 796 | 561 | 801 | 994 |
| SS at 480 nm unfiltered | 827 | 1827 | 797 | 975 |
| SS at 480 nm filtered | 724 | 488 | 729 | 857 |
| SS at 580 nm unfiltered | 886 | 1940 | 880 | 1141 |
| SS at 580 nm filtered | 883 | 571 | 886 | 1123 |
| SS ratio | 1.00 | 0.29 | 1.01 | 0.98 |

As the data indicate, the peak melting points of Inks 1 and 2 are about 80° C., and their viscosities are close to about 10.6 at 110° C., indicating that they are suitable for jetting at temperatures of from about 105 to about 115° C. Their high spectral strengths and SS ratio (around 1.0) confirm good dissolution of the black dye as described in Example I. In contrast, the commercial dye SK45 in Comparative Ink B exhibited very poor solubility in the ink base, as evidenced by its low SS ratio. In addition, the inks prepared from the narrow waxes having about 15 percent of the lower molecular weight fraction and about 15 percent of the upper molecular weight fraction removed therefrom exhibited desirably lower freezing points as compared to Comparative Inks A and B, enabling setting printer standby temperatures at lower settings and thus enabling low energy consumption. The reduced freezing points of inks 1 and 2 is believed to be attributable to the removal of the upper molecular weight fraction of the polyethylene wax.

Printhead Clogging

One aspect of ink reliability in a printhead is whether it will clog the printhead during performance in a printer over time. Tests were performed mimicking the true filtration behavior inside a printer in which the ink passed through a screen filter driven by gravity at 110° C. Clogging of the filter screen led to a decrease of the ink flow rate, which in turn would cause weak or missing jets. Comparative Ink A, containing commercial polyethylene wax PE 500, and Ink 2, containing "narrow" molecular weight range polyethylene wax, were both tested at 110° C. The inks were tested fresh and after 6 days at 110° C. Comparative Ink A failed this test, exhibiting substantial filter clogging manifested by slowing in the filtration rate and eventual stoppage of flow of the inks through the filter, whereas Ink 2 passed this test with no obvious clogging of the filter.

Printing Temperature Performance

Inks A, 1, and 2 were incorporated into a XEROX® PHASER® 8400 printer modified to enable various temperatures to be tested. From a systems design point of view, it can be desirable to increase the temperature of both the final printing substrate and the intermediate transfer drum. Increased drum temperature facilitates the needed temperature gradient relative to ambient in order to transfer sufficient heat such that sustained printing can be achieved. To measure cohesive failure the drum temperature is increased until the ink is so soft that it fractures and, therefore, does not transfer off the drum. Increased final medium preheating typically maximizes image transfer efficiency and ink durability. Medium preheating can be accomplished using direct heat conduction through the contact of a metal plate-on-plate paper preheater that contacts the medium on both sides just prior to transferring the image to the medium. During a duplex print job, however, the medium already has one side imaged, and the ink itself thus must contact the metal plate preheater. If the ink smears or smudges down the page during the contact of the preheater, this is termed smudge. The highest temperature the medium preheater can obtain without any noticeable smudge is the smudge temperature, and is the highest temperature at which the preheater can be operated. Accordingly, it can be desirable to increase the setpoint of the intermediate transfer member and desirable to increase the temperature of the final transfer recording sheet medium for better control, or to avoid blocking, duplex smudging, or the like. Thus, phase change inks that provide the flexibility of allowing such temperature increases are desirable. Ink A and Inks 1 and 2 had the following maximum temperatures (° C.) in the test fixture:

|  | Cohesive Failure temp. | Intermediate Transfer Member Setpoint temp. | Smudge Failure temp. |
| --- | --- | --- | --- |
| Ink A | 58 | 40-44 | 55 |
| Ink 1 | 63 | 42-52 | 60 |
| Ink 2 | 64-63 | 49-52 | 60 |

As the results indicate, the inks containing the "narrow" molecular weight range polyethylene wax enabled higher maximum temperatures, thereby enabling greater flexibility in printer temperature settings than the ink containing the commercial polyethylene wax PE 500.

Print Performance

Inks A, 1, and 2 were tested for jetting, transfixing, and durability of the resultant prints. The results are summarized in the table below after the inks were jetted at 110° C. in a XEROX® PHASER® 8400 with various intermediate transfer drum temperatures. Inks 1 and 2 exhibited good jetting and transfixing performance as evidenced by their score marks of dropouts. In contrast, Comparative Ink B exhibited poor dropout at relatively high drum temperatures. The performance is scored relative to dropout performance of the ink supplied commercially for the XEROX® PHASER® 8400 printer under its standard printing mode. "Better" means less dropout. Dropout refers to the efficiency of ink transfer from the print engine to the final recording sheet. When dropout is very bad, part of the image is missing from the print (i.e., the pixels are not transferred from the intermediate transfer member to the final recording sheet). Dither dropout refers to a transfer failure when printing dithered images (for example, 30 percent to 70 percent coverage) and on rough recording sheets. Solid dropout refers to a transfer failure when printing a solid fill (the highest fill for any given color) on smooth or rough recording sheets. To measure dropout, a chase recording sheet with a very smooth surface is run at relatively slow transfix velocity immediately after a print. The chase sheet is used to pick up any ink that was left on the intermediate transfer member. The chase sheet is scanned and the value of dropout is recorded. In all instances, the paper temperature was 60° C.

|  | Dither Dropout | | | Solid Fill Dropout | | |
| --- | --- | --- | --- | --- | --- | --- |
|  | Drum Temp. | | | | | |
|  | 48° C. | 52° C. | 58° C. | 50° C. | 55° C. | 60° C. |
| Ink A | similar | worse | worse | worse | worse | worse |
| Ink 1 | better | similar | similar | similar | worse | worse |
| Ink 2 | better | similar | similar | better | better | better |

Ink Stick Sweating

Inks A and 2 were evaluated for sweating, which is a problem wherein some ink ingredients migrate to the surface of solid ink sticks and aggregate at the ink stick surface inside the printer; the sticky "sweat" gradually drains down to the bottom and can cause the ink sticks to adhere to the ink load racks in the printers. Sticks were formed of the inks and sweating was evaluated visually by placing the sticks in pans in an oven at various temperatures for three days. The results are summarized in the table below.

|  | 50° C. | 60° C. | 70° C. |
| --- | --- | --- | --- |
| Ink A | no sweating | a little sweating | much sweating |
| Ink 2 | no sweating | no sweating | no sweating |

As the results indicate, the ink prepared containing the wax having the "narrow" molecular weight range polyethylene wax exhibited improved behavior compared to the ink containing the commercial polyethylene wax.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising (a) a phase change ink carrier comprising (1) an amide; and (2) a polyethylene wax having an average peak molecular weight of from about 350 to about 730 and a polydispersity of from about 1.0001 to about 1.5; and (b) a colorant compound of the formula

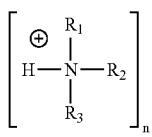

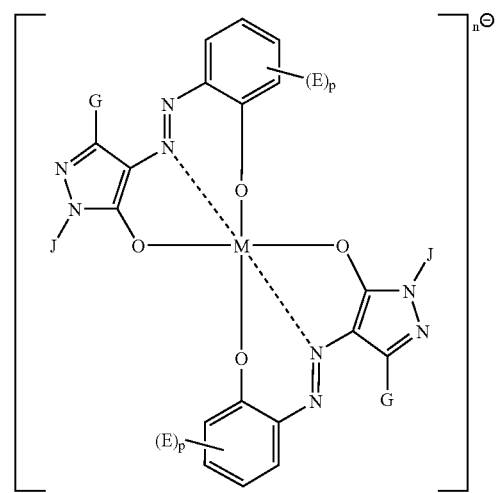

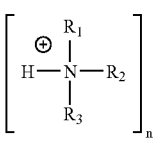

or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms (excluding atoms in any substituents) in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3.

2. An ink according to claim 1 wherein the polyethylene wax has an average peak molecular weight of from about 400 to about 700.

3. An ink according to claim 1 wherein the polyethylene wax has an average peak molecular weight of from about 470 to about 600.

4. An ink according to claim 1 wherein the polyethylene wax has a polydispersity of no more than about 1.200.

5. An ink according to claim 1 wherein the polyethylene wax has a polydispersity of no more than about 1.100.

6. An ink according to claim 1 wherein the polyethylene wax has a polydispersity of no more than about 1.050.

7. An ink according to claim 1 wherein the polyethylene wax has a peak melting point of at least about 50° C.

8. An ink according to claim 1 wherein the polyethylene wax has a peak melting point of at least about 70° C.

9. An ink according to claim 1 wherein the polyethylene wax has an onset melting point of at least about 50° C.

10. An ink according to claim 1 wherein the polyethylene wax has an onset melting point of at least about 55° C.

11. An ink according to claim 1 wherein the polyethylene wax has a viscosity at about 110° C. of at least about 3 centipoise.

12. An ink according to claim 1 wherein the polyethylene wax has a viscosity at about 110° C. of no more than about 10 centipoise.

13. An ink according to claim 1 wherein the polyethylene wax is present in the ink in an amount of at least about 10 percent by weight of the ink carrier.

14. An ink according to claim 1 wherein the polyethylene wax is present in the ink in an amount of no more than about 90 percent by weight of the carrier.

15. An ink according to claim 1 wherein the branched triamide is of the formula $$\begin{array}{c} \text{CH}_2-(\text{O}-\text{CH}_2-\text{CH})_x-\text{NH}-\overset{\text{O}}{\underset{\|}{\text{C}}}-(\text{CH}_2)_p\text{CH}_3 \\ | \\ \text{CH}_3 \end{array}$$

$$\text{CH}_3\text{CH}_2-\underset{|}{\text{C}}-\text{CH}_2-(\text{O}-\text{CH}_2-\text{CH})_y-\text{NH}-\overset{\text{O}}{\underset{\|}{\text{C}}}-(\text{CH}_2)_q\text{CH}_3$$

$$\begin{array}{c} | \\ \text{CH}_2-(\text{O}-\text{CH}_2-\text{CH})_z-\text{NH}-\overset{\text{O}}{\underset{\|}{\text{C}}}-(\text{CH}_2)_r\text{CH}_3 \\ | \\ \text{CH}_3 \end{array}$$

wherein x, y, and z each independently represent the number of propyleneoxy repeat units and x+y+z is from about 5 to about 6, and wherein p, q, and r each, independently of the others, are integers representing the number of repeat —(CH$_2$)— units.

16. An ink according to claim 15 wherein p, q, and r have an average peak value of from about 15 to about 60.

17. An ink according to claim 15 wherein p, q, and r have an average peak value of from about 26 to about 45.

18. An ink according to claim 1 wherein the triamide is present in the ink in an amount of at least about 2 percent by weight of the ink carrier.

19. An ink according to claim 1 wherein the triamide is present in the ink in an amount of no more than about 50 percent by weight of the ink carrier.

20. An ink according to claim 1 wherein the colorant is present in the ink in an amount of at least about 0.1 percent by weight of the ink.

21. An ink according to claim 1 further containing a monoamide.

22. An ink according to claim 21 wherein the monoamide is stearyl stearamide.

23. An ink according to claim 21 wherein the monoamide is present in the ink in an amount of at least about 2 percent by weight of the ink.

24. An ink according to claim 1 further containing an isocyanate-derived material.

25. An ink according to claim 24 wherein the isocyanate-derived material is a urethane resin obtained from the reaction of two equivalents of hydroabietyl alcohol and one equivalent of isophorone diisocyanate.

26. An ink according to claim 24 wherein the urethane resin is present in the ink in an amount of at least about 2 percent by weight of the ink carrier.

27. An ink according to claim 24 wherein the isocyanate-derived material is a urethane resin that is the adduct of three equivalents of stearyl isocyanate and a glycerol-based alcohol.

28. An ink according to claim 27 wherein the urethane resin is present in the ink in an amount of at least about 0.5 percent by weight of the ink carrier.

29. An ink according to claim 1 further containing a triglyceride of hydrogenated abietic acid.

30. An ink according to claim 1 further containing Disperse Orange 47.

31. An ink according to claim 30 wherein the Disperse Orange is present in the ink in an amount of at least about 0.01 part by weight Disperse Orange 47 per every one part by weight colorant of the formula $$\left[ \begin{array}{c} \overset{\oplus}{R_1} \\ | \\ H-N-R_2 \\ | \\ R_3 \end{array} \right]_n$$

[Structural formulas of metal-azo complex colorants with counterions]

or mixture thereof.

32. An ink according to claim 30 wherein the Disperse Orange is present in the ink in an amount of no more than about 1 part by weight Disperse Orange 47 per every one part by weight colorant of the formula or mixture thereof.

33. An ink according to claim 1 wherein the colorant of the formula

-continued
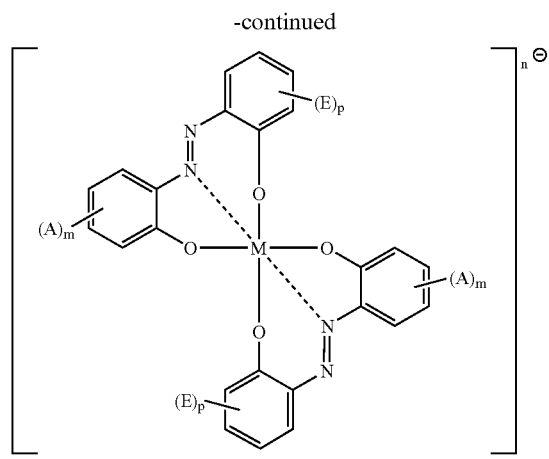
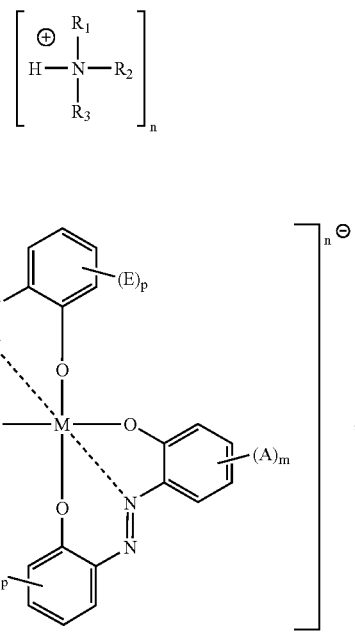
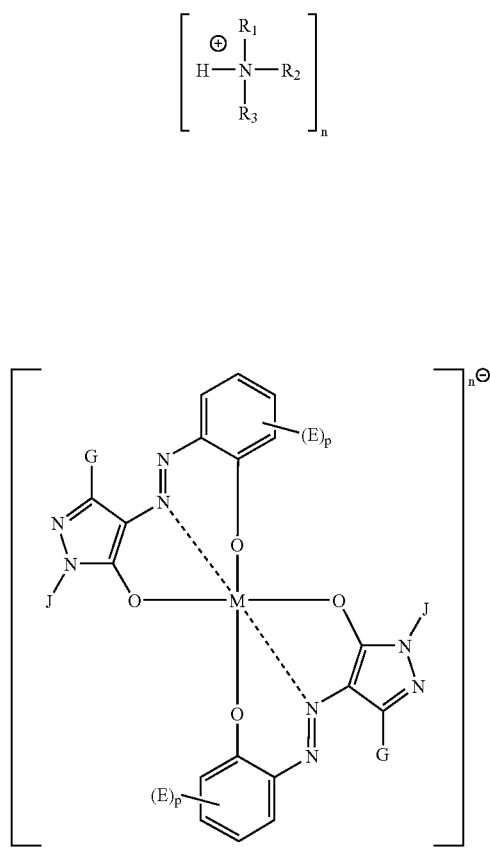
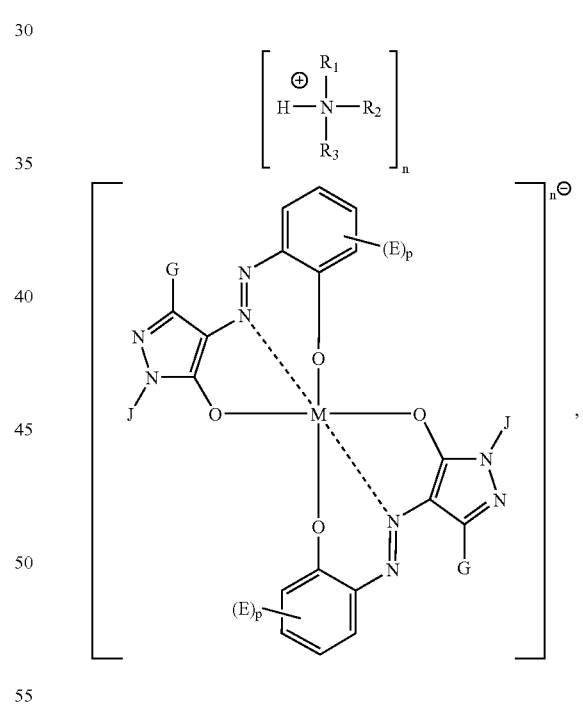
or mixture thereof is present in the ink in an amount of at least about 0.1 percent by weight of the ink.
34. An ink according to claim 1 wherein the colorant of the formula
or mixture thereof is present in the ink in an amount of no more than about 50 percent by weight of the ink.
35. An ink according to claim 1 wherein the colorant is of the formula
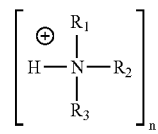

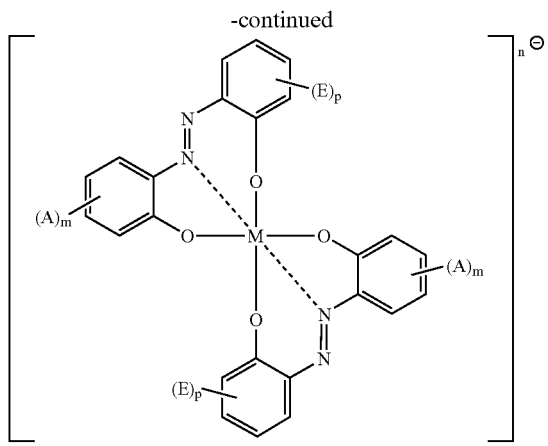

36. An ink according to claim 1 wherein the colorant is of the formula

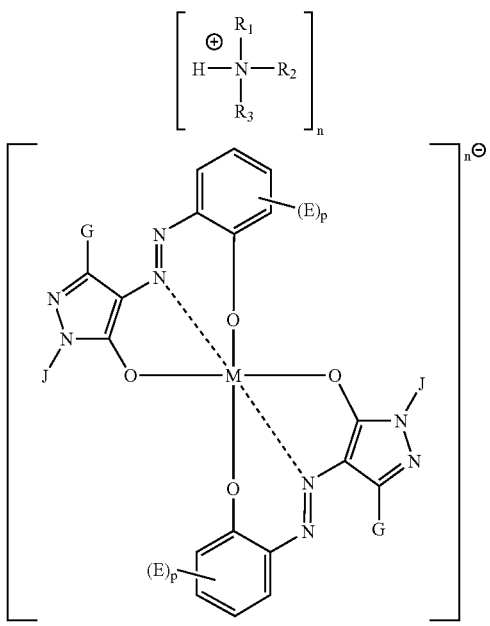

,

37. An ink according to claim 1 wherein at least one of A, E, G, and J is an alkyl group, provided that when A is the at least one alkyl group, m is at least 1, and provided that when E is the at least one alkyl group, p is at least 1.

38. An ink according to claim 37 wherein the alkyl group is a substituted alkyl group.

39. An ink according to claim 37 wherein the alkyl group is an unsubstituted alkyl group.

40. An ink according to claim 37 wherein the alkyl group contains at least one heteroatom therein.

41. An ink according to claim 37 wherein the alkyl group contains no heteroatoms therein.

42. An ink according to claim 1 wherein at least one of A, E, G, and J is an aryl, arylalkyl, or alkylaryl group, provided that when A is the at least one aryl, arylalkyl, or alkylaryl group, m is at least 1, and provided that when E is the at least one aryl, arylalkyl, or alkylaryl group, p is at least 1.

43. An ink according to claim 42 wherein the aryl, arylalkyl, or alkylaryl group is a substituted aryl, arylalkyl, or alkylaryl group.

44. An ink according to claim 42 wherein the aryl, arylalkyl, or alkylaryl group is an unsubstituted aryl, arylalkyl, or alkylaryl group.

45. An ink according to claim 42 wherein the aryl, arylalkyl, or alkylaryl group contains at least one heteroatom therein.

46. An ink according to claim 42 wherein the aryl, arylalkyl, or alkylaryl group contains no heteroatoms therein.

47. An ink according to claim 1 wherein at least one of A, E, and G is a substituent selected from the group consisting of a hydroxy group, a halogen atom, an amine group an imine group, an ammonium group, a cyano group, a pyridine group, a pyridinium group, an ether group, an aldehyde group, a ketone group, an ester group, an amide group, a carbonyl group, a thiocarbonyl group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azo group, a cyanato group, a carboxylate group, a carboxylic acid group, a urethane group, a urea group, or mixtures thereof, provided that when A is the at least one substituent, m is at least 1, and provided that when E is the at least one substituent, p is at least 1.

48. An ink according to claim 1 wherein n is 1.

49. An ink according to claim 1 wherein n is 2 or 3.

50. An ink according to claim 1 wherein M is a metal in the Lanthanide Series.

51. An ink according to claim 1 wherein M is chromium, iron, cobalt, molybdenum, tungsten, ruthenium, osmium, rhodium, iridium, manganese, rhenium, vanadium, niobium, tantalum, titanium, zirconium, hafnium, scandium, yttrium, lanthanum, zinc, aluminum, or mixtures thereof.

52. An ink according to claim 1 wherein M is chromium, iron, cobalt, or mixtures thereof.

53. An ink according to claim 1 wherein M is chromium.

54. An ink according to claim 1 wherein the colorant is of the formula

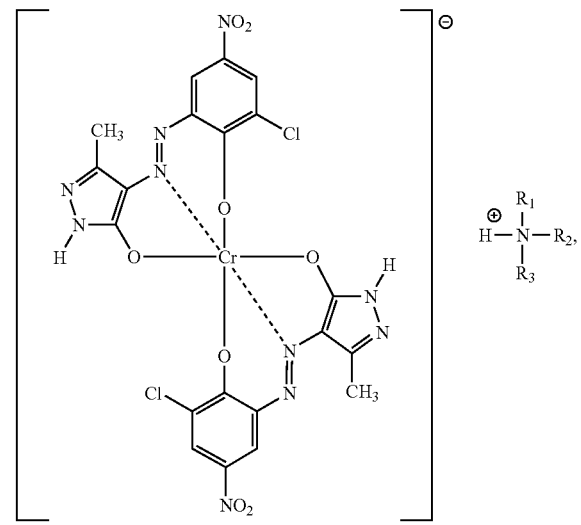

-continued
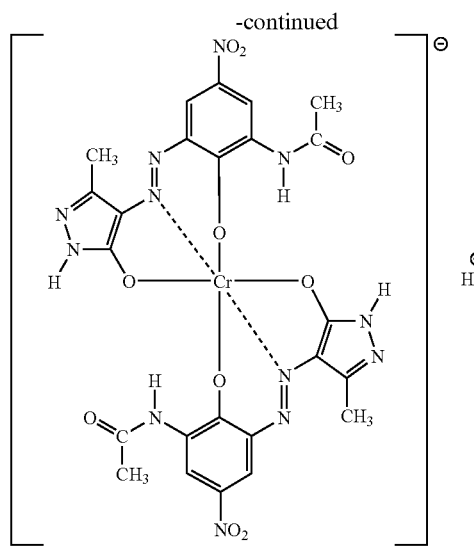
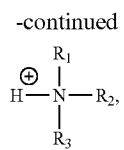
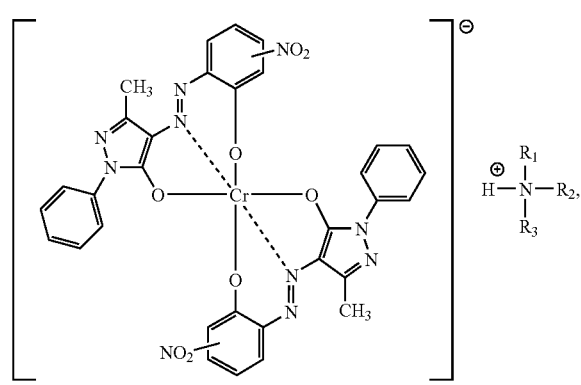
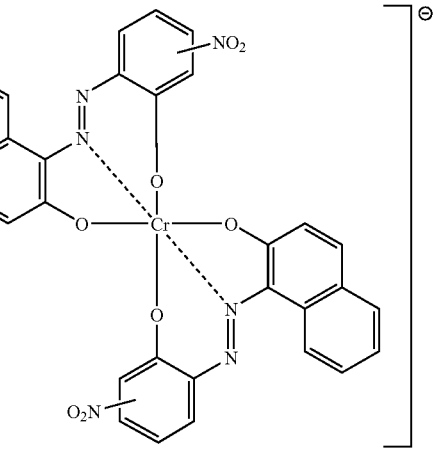
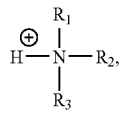
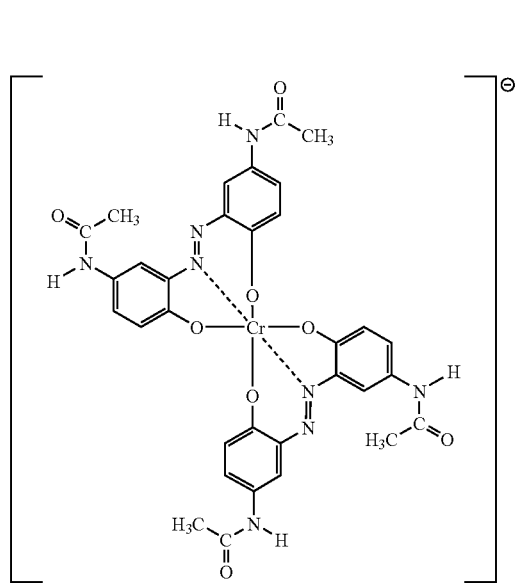
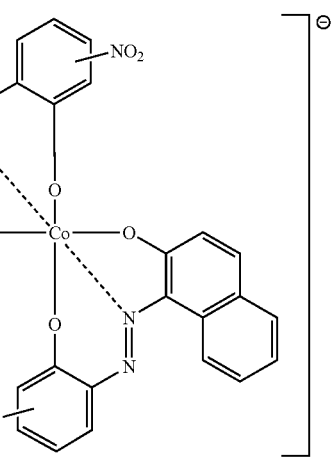
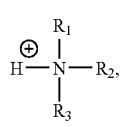

-continued

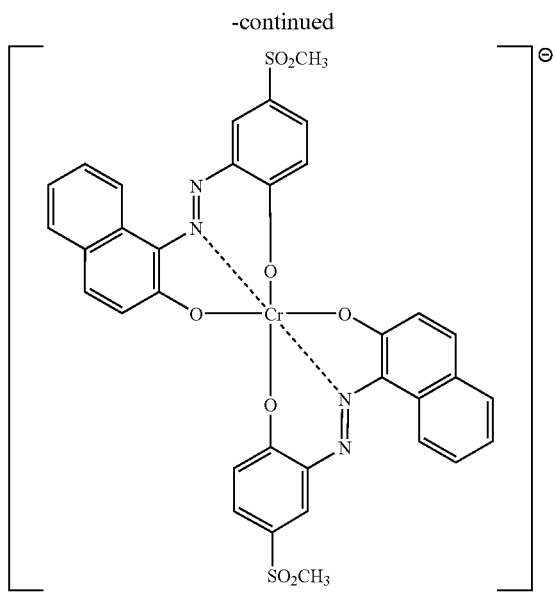

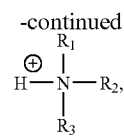

or mixtures thereof.

55. An ink according to claim 1 wherein the colorant is of the formula

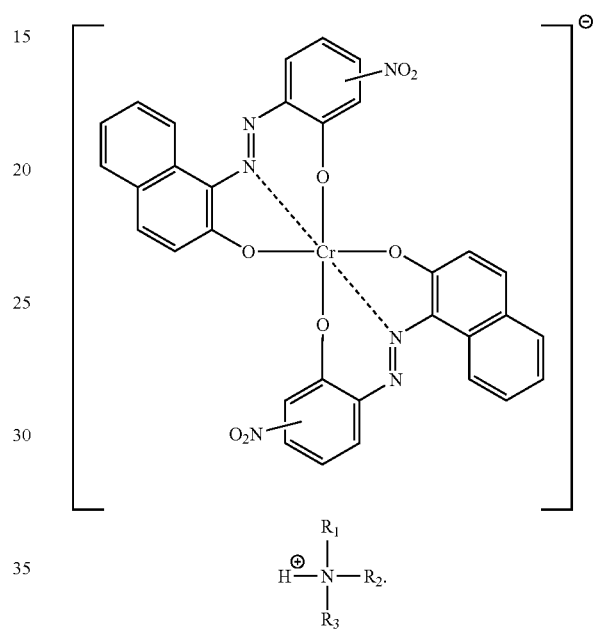

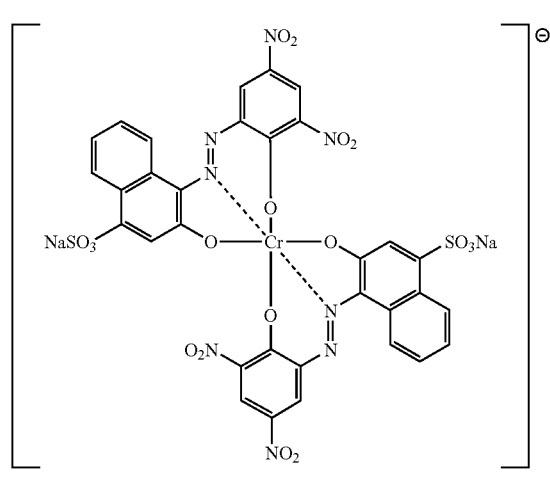

56. An ink according to claim 1 wherein $R_1$, $R_2$, and $R_3$ each, independently of the others, are hydrogen atoms or alkyl groups, including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group.

57. An ink according to claim 56 wherein at least one of the alkyl groups is linear.

58. An ink according to claim 56 wherein at least one of the alkyl groups is branched.

59. An ink according to claim 56 wherein at least one of the alkyl groups is substituted.

60. An ink according to claim 56 wherein at least one of the alkyl groups is unsubstituted.

61. An ink according to claim 56 wherein at least one of the alkyl groups has hetero atoms therein.

62. An ink according to claim 56 wherein at least one of the alkyl groups has no hetero atoms therein.

63. An ink according to claim 56 wherein $R_1$, $R_2$, and $R_3$ are the same as each other.

64. An ink according to claim 56 wherein at least two of $R_1$, $R_2$, and $R_3$ are different from each other.

65. An ink according to claim 56 wherein all three of $R_1$, $R_2$, and $R_3$ are different from each other.

66. An ink according to claim 1 wherein at least one of $R_1$, $R_2$, and $R_3$ is an aryl group, an arylalkyl group, or an alkylaryl group.

67. An ink according to claim 66 wherein the aryl, arylalkyl, or alkylaryl group is substituted.

68. An ink according to claim 66 wherein the aryl, arylalkyl, or alkylaryl group is unsubstituted.

69. An ink according to claim 66 wherein the aryl, arylalkyl, or alkylaryl group contains at least one heteroatom therein.

70. An ink according to claim 66 wherein the aryl, arylalkyl, or alkylaryl group contains no heteroatoms therein.

71. An ink according to claim 1 wherein the colorant compound is of the formula -continued

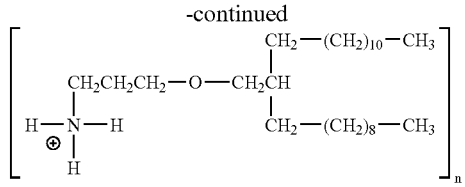

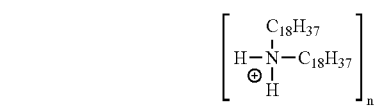

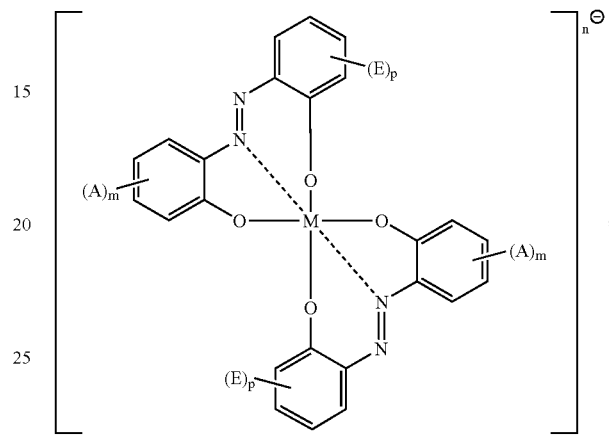

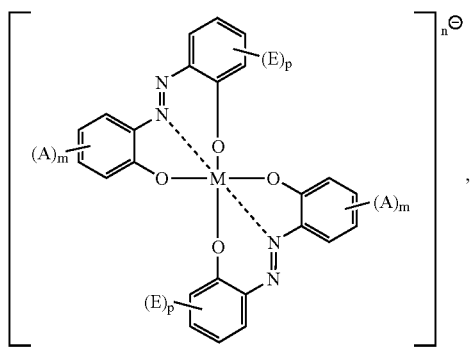

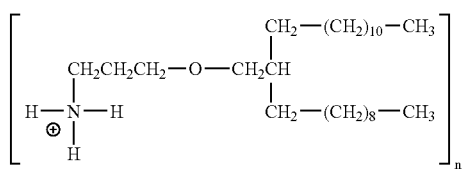

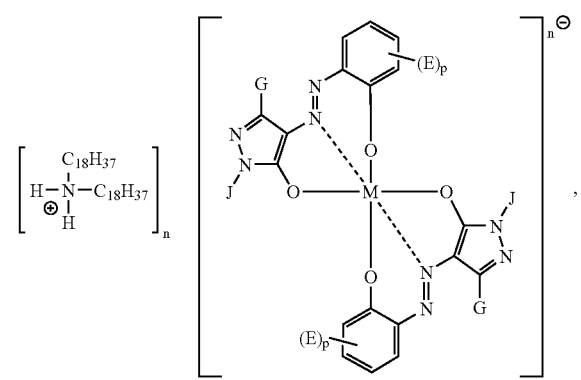

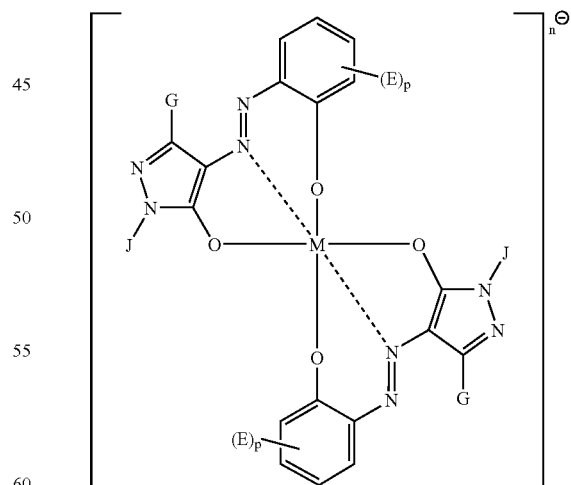

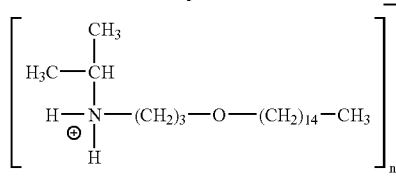

-continued
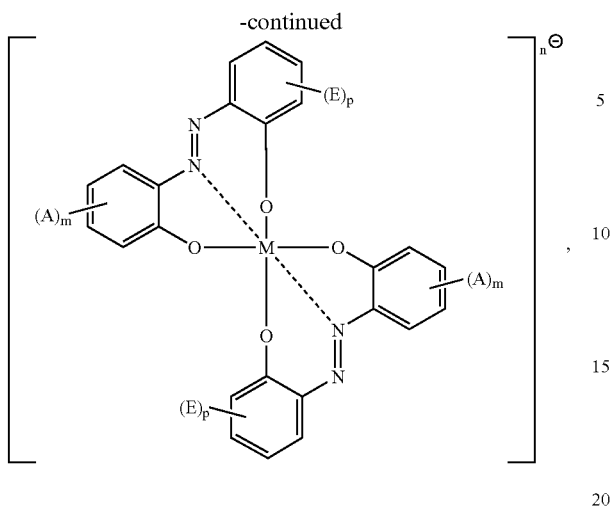
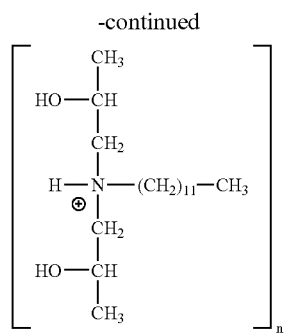
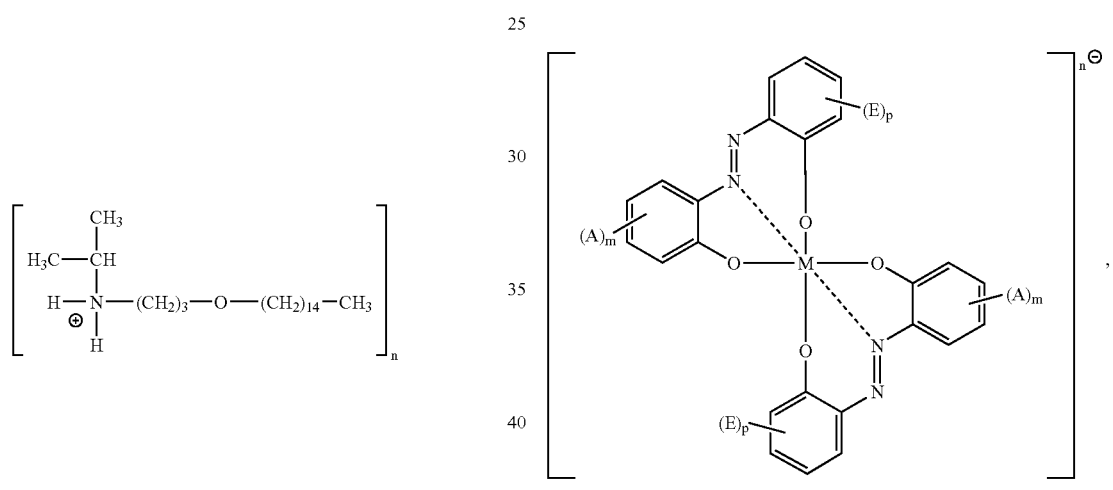
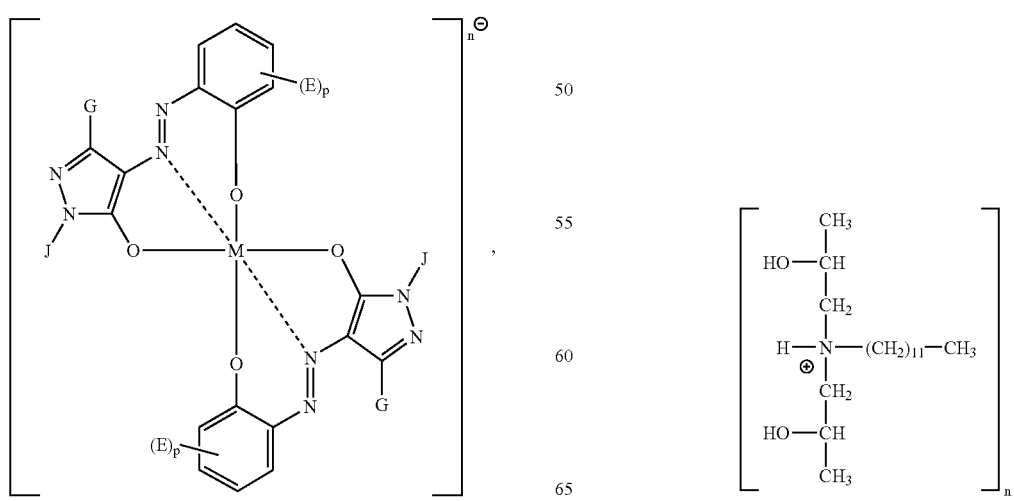

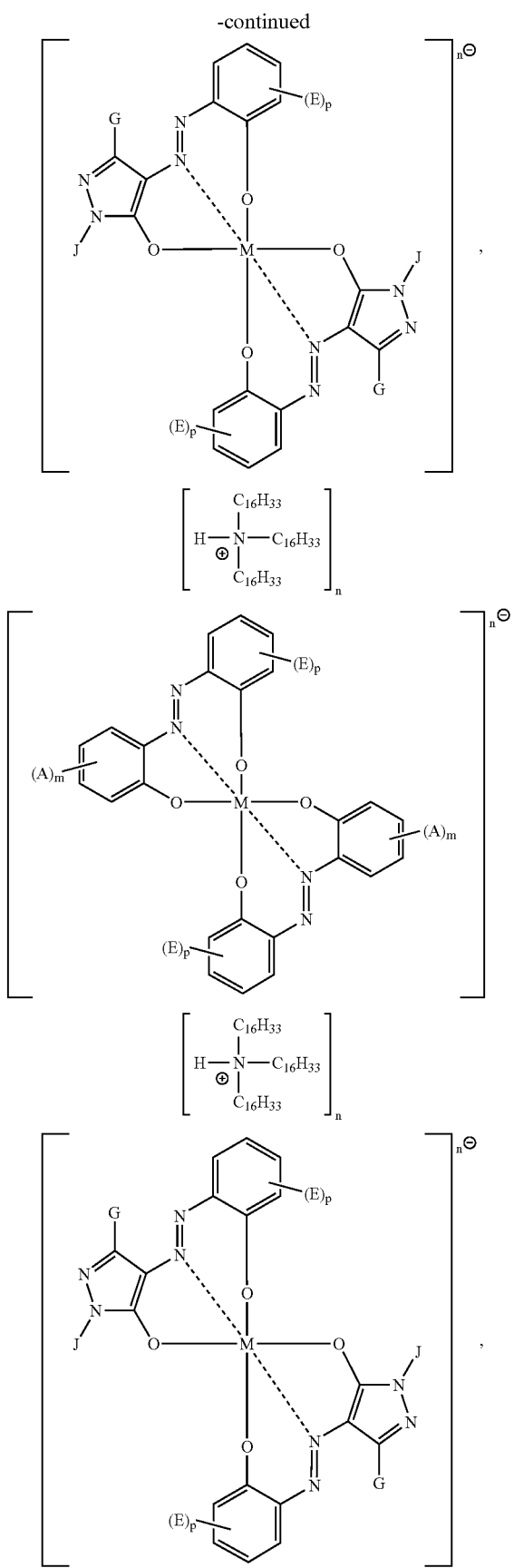

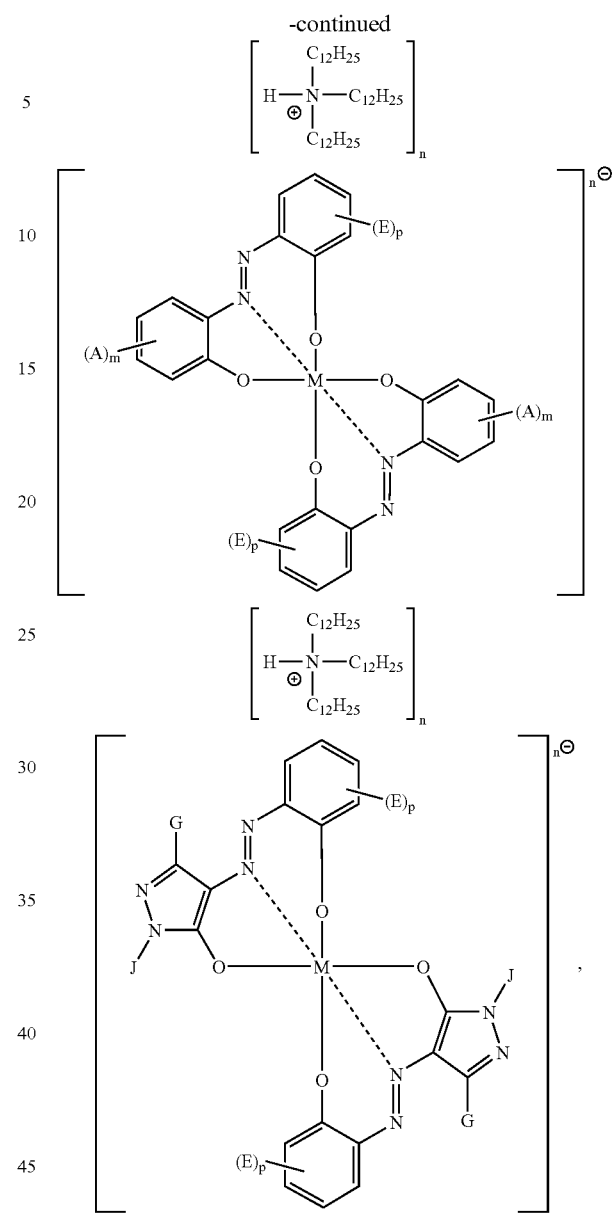

or mixtures thereof.

72. An ink according to claim 1 wherein the ink has a peak melting point of at least about 50° C.

73. An ink according to claim 1 wherein the ink has a peak melting point of at least about 70° C.

74. An ink according to claim 1 wherein the ink has a peak melting point of no more than about 140° C.

75. An ink according to claim 1 wherein the ink has a peak melting point of no more than about 100° C.

76. An ink according to claim 1 wherein the ink has a viscosity at the jetting temperature of no more than about 20 centipoise.

77. An ink according to claim 76 wherein the jetting temperature is no more than about 120° C.

78. An ink according to claim 1 wherein the ink has a viscosity at the jetting temperature of no more than about 15 centipoise.

79. An ink according to claim 78 wherein the jetting temperature is no more than about 120° C.

80. An ink according to claim 1 wherein the ink has a viscosity of from about 7 to about 15 centipoise at about 110° C.

81. An ink according to claim 1 wherein the ink has a viscosity of from about 7 to about 15 centipoise at about 115° C.

82. An ink according to claim 1 wherein the ink has a viscosity of from about 7 to about 15 centipoise at about 120° C.

83. An ink according to claim 1 wherein the polyethylene wax has a melting range of at least about 5° C.

84. An ink according to claim 1 wherein the polyethylene wax has a melting range of no more than about 40° C.

85. An ink according to claim 1 wherein the polyethylene wax has a melting range of no more than about 35° C.

86. An ink according to claim 1 wherein the polyethylene wax has a melting range of no more than about 30° C.

87. An ink according to claim 1 wherein the polyethylene wax has a freezing point of at least about 40° C.

88. An ink according to claim 1 wherein the polyethylene wax has a freezing point of no more than about 80° C.

89. An ink according to claim 1 wherein the polyethylene wax has a freezing point of no more than about 75° C.

90. An ink according to claim 1 wherein the polyethylene wax has a freezing point of no more than about 70° C.

91. An ink according to claim 1 wherein the polyethylene wax has a peak melting point of from about 70° C. to about 120° C. and a polydispersity of no more than about 1.050.

92. An ink according to claim 1 wherein the polyethylene wax has a peak melting point of from about 70° C. to about 120° C. and a viscosity at 110° C. of no more than about 10 centipoise.

93. An ink according to claim 1 wherein the polyethylene wax has a peak melting point of from about 70° C. to about 120° C. and an onset melting point of from about 55° C. to about 69° C.

94. An ink according to claim 1 wherein the polyethylene wax has a peak melting point of from about 70° C. to about 120° C. and a melting range of no more than about 30° C.

95. An ink according to claim 1 wherein the polyethylene wax has an onset melting point of at least about 55° C. and a freezing point lower than about 70° C.

96. An ink according to claim 1 wherein the polyethylene wax has a peak melting point of from about 70° C. to about 120° C., an onset melting point of at least about 55° C., and a melting range of no more than about 30° C.

97. A process which comprises (1) incorporating into an ink jet printing apparatus a phase change ink composition comprising (a) a phase change ink carrier comprising (1) an amide; and (2) a polyethylene wax having an average peak molecular weight of from about 350 to about 730 and a polydispersity of from about 1.0001 to about 1.5; and (b) a colorant compound of the formula

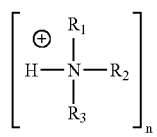

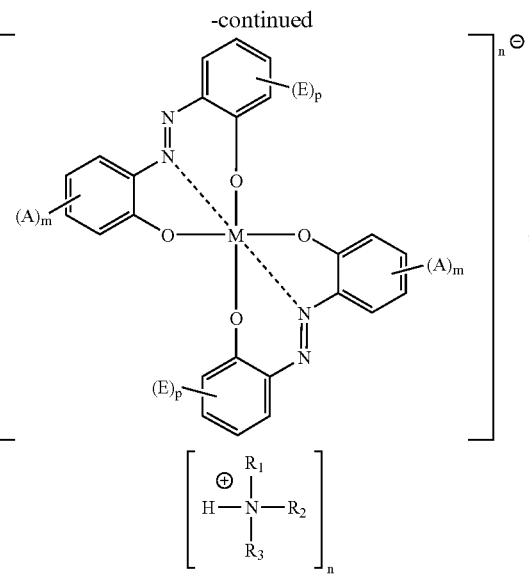

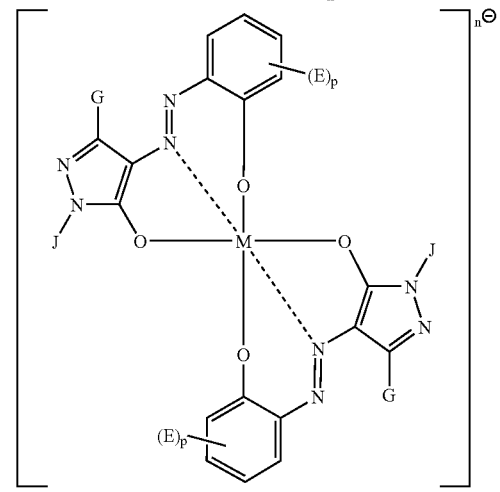

or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms (excluding atoms in any substituents) in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3; (2) melting the ink; and (3) causing droplets of the melted ink to be ejected in an imagewise pattern onto a substrate.

98. A process according to claim 97 wherein the printing apparatus employs a piezoelectric printing process wherein droplets of the ink are caused to be ejected in imagewise pattern by oscillations of piezoelectric vibrating elements.

99. A process according to claim 97 wherein the substrate is a final recording sheet and droplets of the melted ink are ejected in an imagewise pattern directly onto the final recording sheet.

100. A process according to claim 97 wherein the substrate is an intermediate transfer member and droplets of the melted ink are ejected in an imagewise pattern onto the intermediate transfer member followed by transfer of the imagewise pattern from the intermediate transfer member to a final recording sheet.

101. A process according to claim 100 wherein the intermediate transfer member is heated to a temperature above that of the final recording sheet and below that of the melted ink in the printing apparatus.

102. A process according to claim 100 wherein both the intermediate transfer member and the final recording sheet are heated to a temperature below that of the melted ink in the printing apparatus, and wherein the final recording sheet is heated to a temperature above that of the intermediate transfer member and below that of the melted ink in the printing apparatus.

103. A process according to claim 100 wherein both the intermediate transfer member and the final recording sheet are heated to a temperature below that of the melted ink in the printing apparatus, and wherein the intermediate transfer member is heated to a temperature above that of the final recording sheet and below that of the melted ink in the printing apparatus.

\* \* \* \* \*